(12) United States Patent
Oka et al.

(10) Patent No.: US 7,520,364 B2
(45) Date of Patent: Apr. 21, 2009

(54) TRACTOR

(75) Inventors: Yozo Oka, Osaka (JP); Nobuaki Takahashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 190 days.

(21) Appl. No.: 11/661,557

(22) PCT Filed: Aug. 30, 2005

(86) PCT No.: PCT/JP2005/015729

§ 371 (c)(1),
(2), (4) Date: Apr. 12, 2007

(87) PCT Pub. No.: WO2006/025365

PCT Pub. Date: Mar. 9, 2006

(65) Prior Publication Data

US 2008/0099264 A1     May 1, 2008

(30) Foreign Application Priority Data

Aug. 31, 2004   (JP)   ............................ 2004-252337
Mar. 2, 2005    (JP)   ............................ 2005-058198

(51) Int. Cl.
*B62D 25/12*   (2006.01)
(52) U.S. Cl. .................... 180/291; 180/68.1; 180/69.24; 180/89.17; 180/69.2; 296/75; 296/76; 296/26.09; 296/37.1; 296/193.07
(58) Field of Classification Search ................. 180/68.1, 180/69.24, 89.17, 69.2; 296/75, 76, 26.09, 296/37.1, 193.07
See application file for complete search history.

(56) References Cited

U.S. PATENT DOCUMENTS

| 2,413,792 | A | * | 1/1947 | Sharp | 180/69.2 |
| 2,509,665 | A | * | 5/1950 | Apel | 296/37.1 |
| 3,004,790 | A | * | 10/1961 | Mayer | 296/26.09 |
| 3,434,754 | A | * | 3/1969 | Scaglione | 296/76 |
| 3,918,540 | A | * | 11/1975 | Haupt | 180/69.2 |
| 5,193,636 | A | * | 3/1993 | Holm | 180/68.1 |

(Continued)

FOREIGN PATENT DOCUMENTS

JP    59-164268    9/1984

(Continued)

*Primary Examiner*—Christopher P Ellis
*Assistant Examiner*—Cynthia F Collado
(74) *Attorney, Agent, or Firm*—Jordan and Hamburg LLP

(57) ABSTRACT

The present invention can speedily and easily perform the maintenance or the like of hydraulic equipment and the like. Accordingly, in the present invention, in a tractor in which a prime mover portion is arranged on a front portion of a machine body, a driving portion is arranged behind the prime mover portion, a transmission portion is arranged below a driver's seat which is formed in the driving portion, left-side and right-side rear wheels are mounted on the transmission portion by way of a rear axle case, and a cover body is extended over the driving portion, the transmission portion and the left-side and right-side rear wheels, the cover body constitutes a step portion of the driving portion and, the cover body covers the transmission portion from above and covers the left-side and right-side rear wheels from the front side and above, the cover body is formed of a plurality of split-portions, and at least the split-portion which covers the transmission portion from above is detachably formed.

7 Claims, 27 Drawing Sheets

U.S. PATENT DOCUMENTS

| | | | |
|---|---|---|---|
| 5,634,525 A * | 6/1997 | Templeton et al. | 180/69.24 |
| 5,671,820 A * | 9/1997 | Kobayashi et al. | 180/68.1 |
| 5,725,065 A * | 3/1998 | Knurr et al. | 180/69.2 |
| 7,096,987 B2 * | 8/2006 | Moen et al. | 180/69.2 |
| 7,237,636 B2 * | 7/2007 | Ruppert et al. | 180/89.17 |

FOREIGN PATENT DOCUMENTS

| | | |
|---|---|---|
| JP | 60-018460 | 1/1985 |
| JP | 2-30730 | 2/1990 |
| JP | 05-328810 | 12/1993 |
| JP | 7-112671 | 5/1995 |
| JP | 11-243722 | 9/1999 |
| JP | 2004-196268 | 7/2004 |
| JP | 2005-035329 | 2/2005 |

* cited by examiner

TRACTOR

BACKGROUND OF THE INVENTION

The present invention relates to a tractor.

Conventionally, as a type of tractor, there has been known a tractor in which a prime mover portion is arranged on a front portion of a body, a driving portion is arranged behind the prime mover portion, a transmission portion is arranged below a driver's seat which is formed in the driving portion, left-side and right-side rear wheels are mounted on the transmission portion by way of a rear axle case, and a cover body is extended over the driving portion, the transmission portion and the left-side and right-side rear wheels, wherein the cover body constitutes a step portion of the driving portion and covers the transmission portion from above, and covers the left-side and right-side rear wheels from the front side and above. Such a cover body is integrally formed using synthetic resin (see patent literature 1, for example).

However, in the above-mentioned tractor, even when the maintenance is required with respect to only hydraulic devices such as hydraulic valves and the like which are mounted on an upper portion of the transmission portion, it is necessary to remove the whole cover body and, at the same time, the handling property (detachability) of the cover body is poor and hence, the removal operation becomes cumbersome thus giving rise to a drawback that the maintenance property is poor.

Patent literature 1: Japanese Patent Laid-open Hei7 (1995)-112671

SUMMARY OF THE INVENTION (1) According to the first aspect of the present invention, in a tractor in which a prime mover portion is arranged on a front portion of a body, a driving portion is arranged behind the prime mover portion, a transmission portion is arranged below a driver's seat which is formed in the driving portion, left-side and right-side rear wheels are mounted on the transmission portion by way of a rear axle case, and a cover body is extended over the driving portion, the transmission portion and the left-side and right-side rear wheels, the cover body constitutes a step portion of the driving portion, and the cover body covers the transmission portion from above and covers the left-side and right-side rear wheels from the front side and above, the cover body is formed of a plurality of split-portions, and at least the split-portion which covers the transmission portion from above is detachably formed.

In such a constitution, although hydraulic devices and the like which require frequent maintenance are mounted on an upper portion of the transmission portion, a portion of the cover body which covers the transmission portion from above is formed in a split manner and is arranged detachable from the cover body and hence, it is possible to remove only the portion when necessary thus enabling the quick and easy maintenance and the like of the hydraulic devices and the like.

(2) According to the second aspect of the present invention, the cover body is divided and formed of left-side and right-side cover forming bodies and an intermediate cover forming body which is arranged between the left-side and right-side cover forming bodies and, at the same time, the respective forming bodies are detachably mounted on a machine body respectively, the left-side cover forming body integrally forms a left-side step forming member which forms a left-side portion of the step portion and a left-side fender forming member which covers the left-side rear wheel from the front side and from above, the right-side cover forming body integrally forms a right-side step forming member which forms a right side portion of the step portion and a right-side fender forming member which covers the right-side rear wheel from the front side and from above, the intermediate cover forming body is formed of a center step forming member which forms a center portion of the step portion and a transmission portion covering member which covers the transmission portion from above.

In such a constitution, the cover body is divided and formed of left-side and right-side cover forming bodies and an intermediate cover forming body which is arranged between the left-side and right-side cover forming bodies and, at the same time, the respective forming bodies are detachably mounted on a machine body respectively and hence, in performing an operation such as maintenance, it is possible to remove only the forming body which requires a removal thereof whereby the operation such as the maintenance can be efficiently performed.

(3) According to the third aspect of the present invention, in the cover body, a transmission portion covering member is formed of a rigid member and portions of the cover body except for the transmission portion covering member is formed of synthetic resin, and the driver's seat is supported on the transmission portion covering member.

In such a constitution, the transmission portion covering member which covers the transmission portion is formed of the rigid member and portions of the cover body except for the transmission portion covering member is formed of synthetic resin, and the driver's seat is supported on the transmission portion covering member and hence, it is possible to allow the transmission portion covering member which supports the driver's seat to hold the required rigidity whereby the cover body can be made light-weighted while ensuring the necessary strength with respect to most of other portions.

(4) According to the fourth aspect of the present invention, a pair of left and right fender-portion support bodies is mounted in an upwardly erected manner on the left-side and right-side rear axle cases which are respectively communicably connected to left-side and right-side walls of the transmission portion, and the left-side and right-side fender forming members are supported on upper end portions of the respective fender portion support bodies.

In such a constitution, the left-side and right-side fender forming members are supported on the upper end portions of the fender portion support bodies which are mounted above the left-side and right-side rear axle cases in an upwardly erected manner and hence, the respective fender forming members can be firmly supported. Accordingly, an operator can easily get on and off the driving portion by gripping the respective fender forming members with his hands.

(5) According to the fifth aspect of the present invention, the fender forming members are formed on upper end portions of the fender portion support bodies and, at the same time, auxiliary handrail portions are mounted on the fender forming members.

In such a constitution, the auxiliary handrail portions are mounted on the fender forming members formed on the upper end portions of the fender portion support bodies and hence, for example, in a plow operation or the like, when an operator has to perform the operation in a state that his upper half body is turned rearwardly to observe a rear portion or when the operator has to perform the operation in a state that his body is inclined at the time of performing the operation in an inclined land or the like, the operator can perform the operation in a stable state by gripping the auxiliary handrail portions which are firmly mounted on the fender portion support body.

Further, since the auxiliary handrail portions are mounted on the fender portion support body and hence, the number of parts can be reduced.

(6) According to the sixth aspect of the present invention, the cover body is divided and formed of left-side and right-side cover forming bodies and an intermediate cover forming body which is arranged between the left-side and right-side cover forming bodies and, at the same time, the respective forming bodies are detachably mounted on a machine body respectively, and an auxiliary step member which an operator uses in getting on and off the tractor is integrally formed on at least one of the left-side and right-side cover forming bodies.

In such a constitution, the auxiliary step forming member is integrally formed on at least one of the left-side and right-side cover forming bodies and hence, the operator can easily get on or off the driving portion using the auxiliary step forming member.

Here, the auxiliary step forming member is integrally formed on at least one of the left-side and right-side cover forming bodies and hence, compared to a case in which the auxiliary step forming member is mounted on the machine body frame, it is possible to reduce the number of parts and the number of man-hours for assembling.

Further, when the auxiliary step forming member is integrally formed on only one cover forming body on a side that the operator frequently gets on and off the driving portion, it is possible to reduce a manufacturing cost compared to a case that the auxiliary step forming member is formed on both cover forming bodies.

(7) According to the seventh aspect of the present invention, the cover body is divided and formed of left-side and right-side cover forming bodies and an intermediate cover forming body which is arranged between the left-side and right-side cover forming bodies and, at the same time, the respective forming bodies are detachably mounted on a machine body respectively, and an auxiliary step member which an operator uses in getting on and off the tractor is respectively integrally formed on both of the left-side and right-side cover forming bodies.

In such a constitution, the tractor is configured to allow the operator to easily get on and off the driving portion from either one of the left and right side directions using the auxiliary step member and hence, the operator can readily get on and off from either the left side or the right side suitably in response to the condition of an operation site.

SUMMARY OF THE INVENTION

Tractor which Constitutes the First Embodiment

Figure 1:
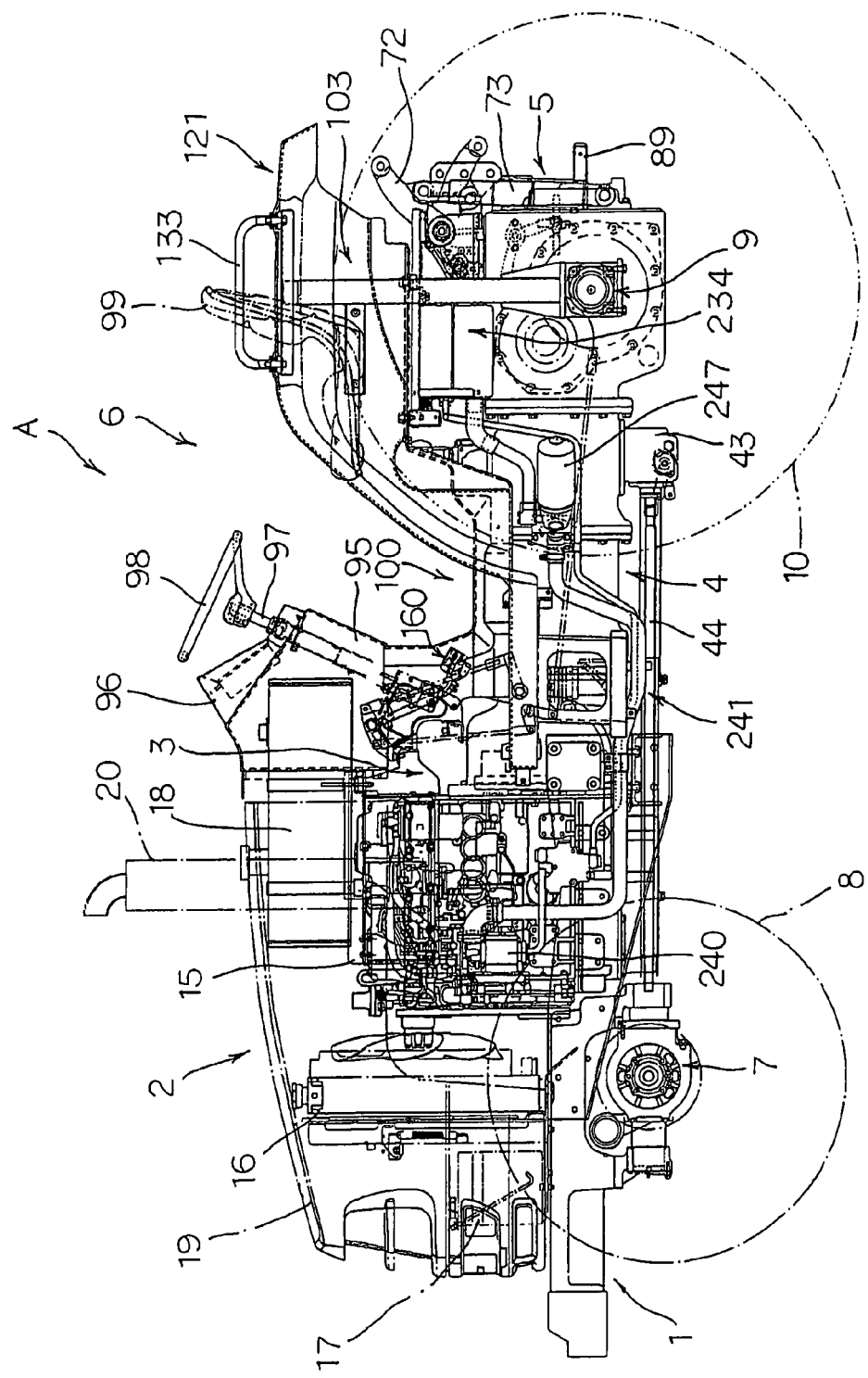
FIG. 1 is an explanatory side view of a tractor of a first embodiment according to the present invention.

Symbol A shown in FIG. 1 indicates a tractor which constitutes the first embodiment according to the present invention, wherein in the tractor A, a prime mover portion 2 is formed on a machine body frame 1, a transmission portion 4 is connected with the prime mover portion 2 in an interlocking manner by way of a clutch portion 3. A PTO transmission portion 5 is detachably mounted on a rear portion of the transmission portion 4 in an interlocking manner. A driving portion 6 is arranged above the transmission portion 4. A pair of left and right front wheels 8, 8 is connected with each other in an interlocking manner by way of a front axle case 7 below the above-mentioned machine body frame 1. Further, a pair of left and right rear wheels 10, 10 is connected with the above-mentioned transmission portion 4 by way of rear axle cases 9, 9.

[Explanation of Prime Mover Portion 2]

The prime mover portion 2 is, as shown in FIG. 1, configured such that an engine 15 is mounted on the machine body frame 1, a radiator 16 is arranged right in front of the engine 15, and a battery 17 is arranged right in front of the radiator 16. Further, at a position right above the engine 15, a fuel tank 18 which is formed in a state that the fuel tank 18 extends in the fore-and-aft direction is arranged, and these parts are covered with a hood 19 which can be opened or closed. Numeral 20 indicates a muffler.

[Explanation of Clutch Portion 3]

Figure 2:
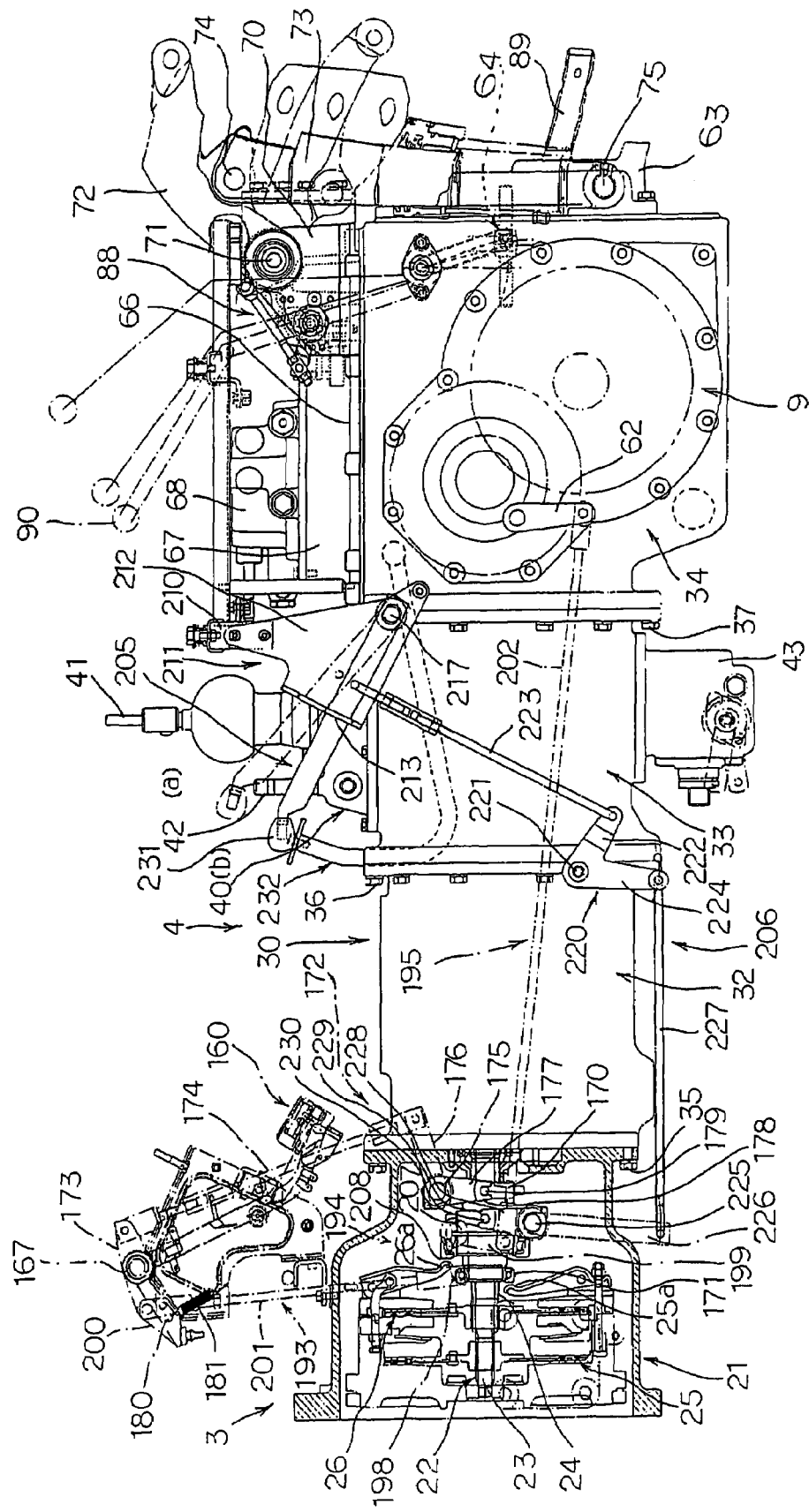
FIG. 2 is an explanatory side view with a part in cross section of a clutch portion and a transmission portion.
Figure 3:
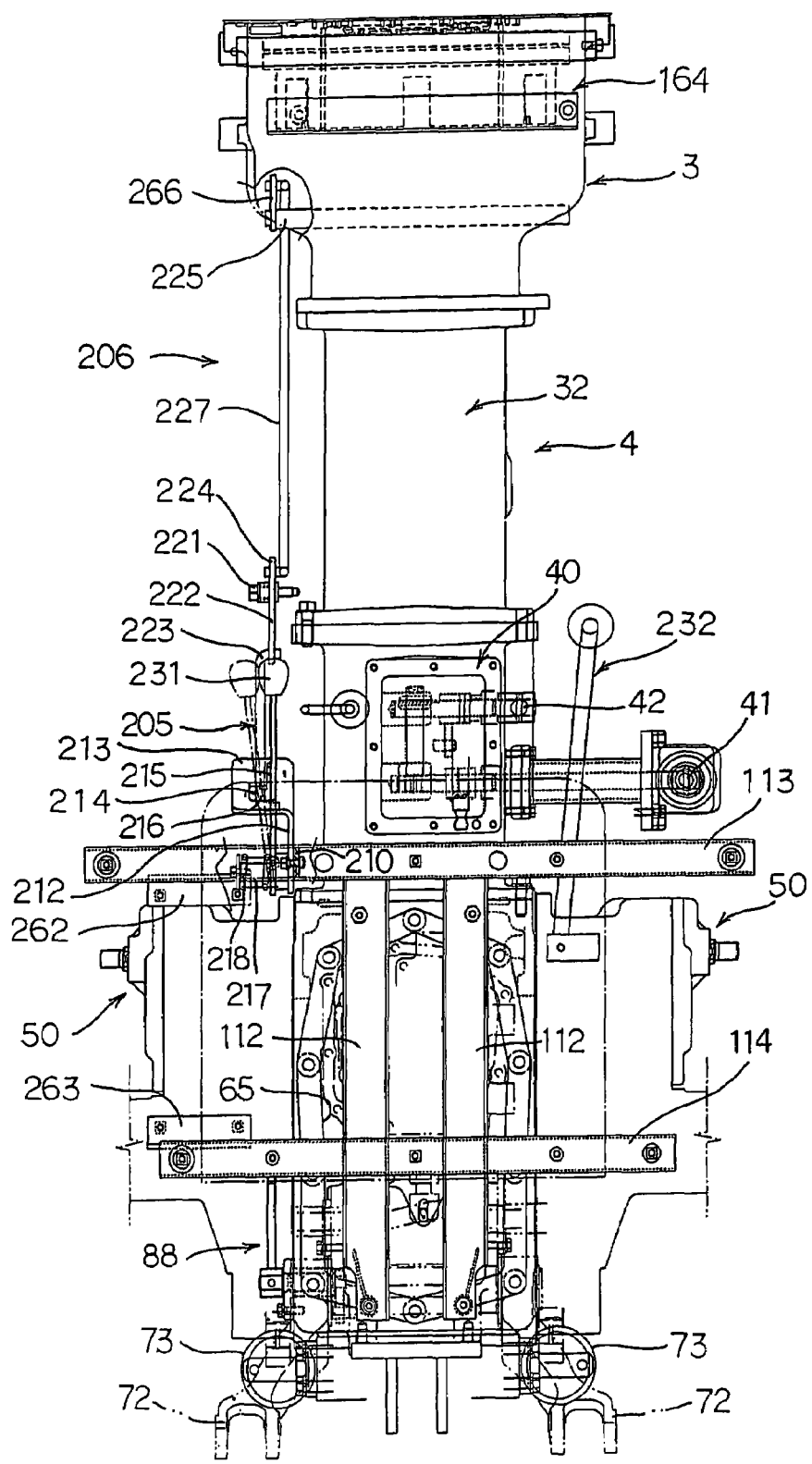
FIG. 3 is an explanatory plan view of the clutch portion and the transmission portion.

In the clutch portion 3, as shown in FIG. 2 and FIG. 3, an inner-and-outer duplicate drive shaft body 22 which extends in the fore-and-aft direction in the inside of a clutch housing 21 is rotatably supported. The inner-and-outer duplicate drive shaft body 22 is formed of an inner drive shaft 23 which extends in the fore-and-aft direction and a cylindrical outer drive shaft 24 which is rotatably fitted on an outer periphery of the inner drive shaft 23.

Then, a proximal end portion (front end portion) of one inner drive shaft 23 is connected with the engine 15 in an interlocking manner by way of a clutch 25 for traveling and, at the same time, a distal end portion (rear end portion) of the inner drive shaft 23 is connected with a traveling system power transmission mechanism (not shown in the drawing) arranged in the inside of the transmission portion 4 in an interlocking manner. Further, a proximal end portion (front end portion) of another outer drive shaft 24 is connected with the engine 15 in an interlocking manner by way of the clutch 26 for PTO and, at the same time, a distal end portion (rear end portion) of the outer drive shaft 24 is connected with a PTO system power transmission mechanism (not shown in the drawing) which is arranged in an extending manner from the transmission portion 4 to a PTO transmission portion 5 in an interlocking manner.

Here, in the inside of the clutch housing 21, the clutch 25 for traveling and the clutch 26 for PTO are arranged close to each other in a coaxial direction in the inside of the inner and outer duplicate drive shaft body 22 thus forming a dual clutch mechanism.

[Explanation of Transmission Portion 4]

With respect to the transmission portion 4, as shown in FIG. 2 and FIG. 3, in a transmission case 30 which extends in the fore-and-aft direction and is formed in a cylindrical shape, a main transmission mechanism (not shown in the drawing), a sub transmission mechanism (not shown in the drawing) and a differential mechanism 31 (see FIG. 5) are arranged sequentially from a front side to a rear side of the transmission portion 4 thus forming the above-mentioned traveling-system power transmission mechanism which can perform the main transmission and the sub transmission. Further, the above-mentioned PTO-system power transmission mechanism is interposed between the above-mentioned outer drive shaft 24 and the PTO transmission portion 5 described later.

Further, the transmission case 30 is divided in three, that is, is divided into a main transmission case 32 which incorporates the main transmission mechanism therein, a sub transmission case 33 which incorporates the sub transmission mechanism therein, and a differential case 34 which incorporates the differential mechanism 31 therein. A front end peripheral portion of the main transmission case 32 is detachably connected to a rear end peripheral portion of the above-mentioned clutch housing 21 using connecting bolts 35, a front end peripheral portion of the sub transmission case 33 is detachably connected to a rear end peripheral portion of the main transmission case 32 using connecting bolts 36, and a front end peripheral portion of the differential case 34 is detachably connected to a rear end peripheral portion of the sub transmission case 33 using connecting bolts 37.

Here, to a ceiling portion of the sub transmission case 33 is, as shown in FIG. 2 and FIG. 3, a lever base case 40 is communicably connected, while respective proximal end portions (lower end portions) of a main transmission lever 41 and a sub transmission lever 42 are interlockingly connected with a lever interlocking mechanism (not shown in the drawing) formed in the lever base case 40.

Further, to a bottom portion of the sub transmission case 33, as shown in FIG. 1 and FIG. 2, a front-wheel driving-power takeout case 43 is communicably connected, while a power transmission shaft 44 (see FIG. 1) is interposed between a front-wheel driving-power takeout mechanism (not shown in the drawing) arranged in the inside of the front-wheel driving-power takeout case 43 and a front wheel driving mechanism (not shown in the drawing) arranged in the inside of the above-mentioned front axle case 7.

Figure 5:
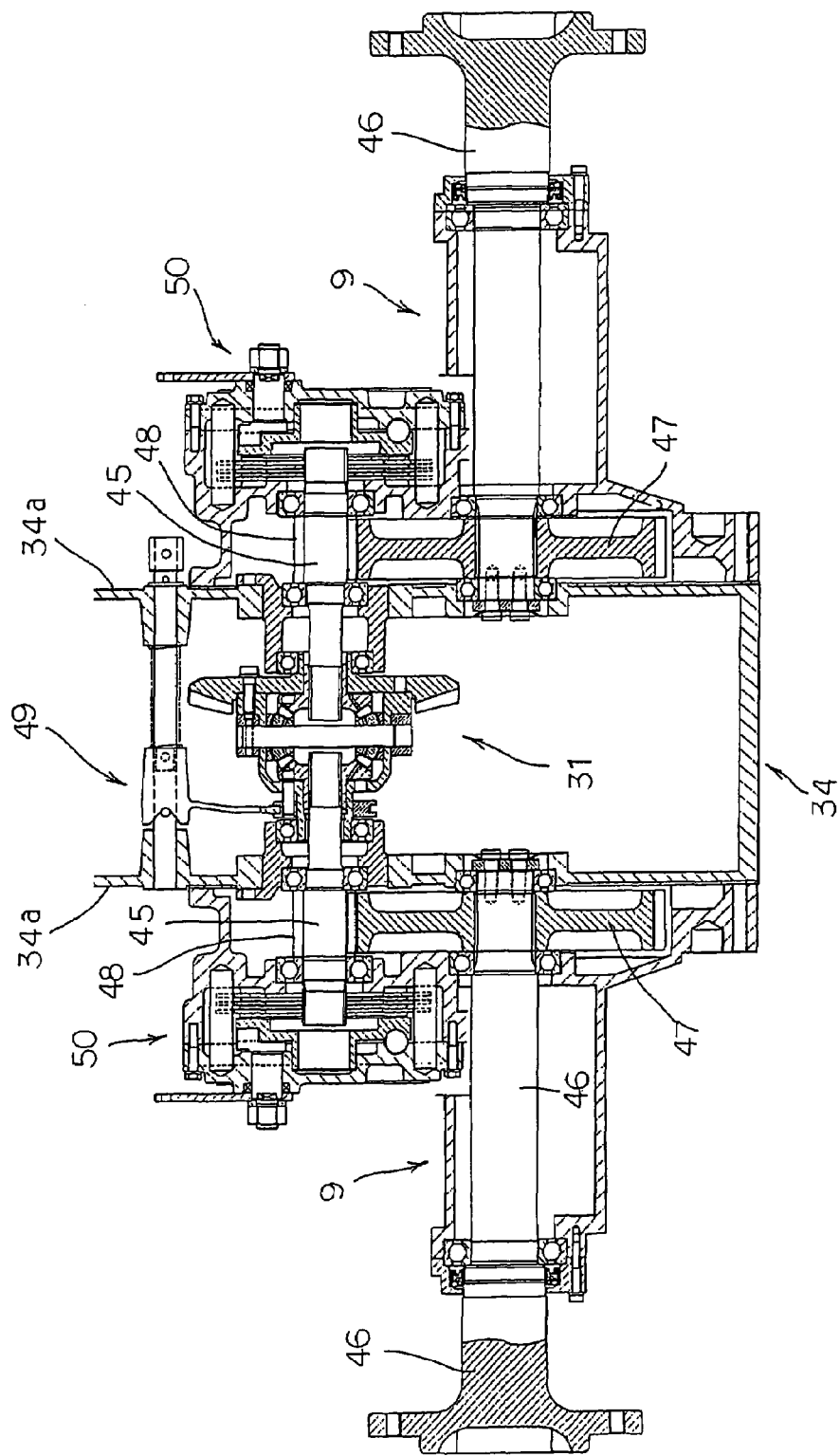
FIG. 5 is a cross-sectional plan view of a differential case and a rear axle case.

Further, to the differential mechanism 31 which is arranged in the inside of the differential case 34, as shown in FIG. 5, proximal end portions (inner end portions) of a pair of left and right output shafts 45, 55 which have axes thereof directed in the left-and-right direction or in the lateral direction are interlockingly connected, while distal end portions (outer end portions) of the respective output shafts 45, 45 project outwardly from left-side and right-side walls 34a, 34a of the differential case 34. Numeral 49 indicates a differential lock manipulation mechanism which is served for performing the differential manipulation of the differential mechanism 31, and a differential lock pedal 232 shown in FIG. 2 and FIG. 3 is interlockingly connected to the differential lock manipulation mechanism 49.

Further, the above-mentioned rear axle cases 9, 9 are mounted on the left-side and right-side walls 34a, 34b, input gears 47, 47 are mounted on proximal end portions of the rear axles 46, 46 which are rotatably supported on the respective rear axle cases 9, 9, output gears 48, 48 are mounted on midst portions of the above-mentioned output shafts 45, 45, and the above-mentioned input gears 47, 47 are meshed with the respective output gears 48, 48.

Further, to upper portions of the respective rear axle cases 9, 9, multiple-disk brake devices 50, 50 are interlockingly connected and, hereinafter, the constitution of the multiple-disk brake device 50 is explained in conjunction with FIG. 6 and FIG. 7.

(Explanation of Multiple-Disc Brake Device 50)

Figure 6:
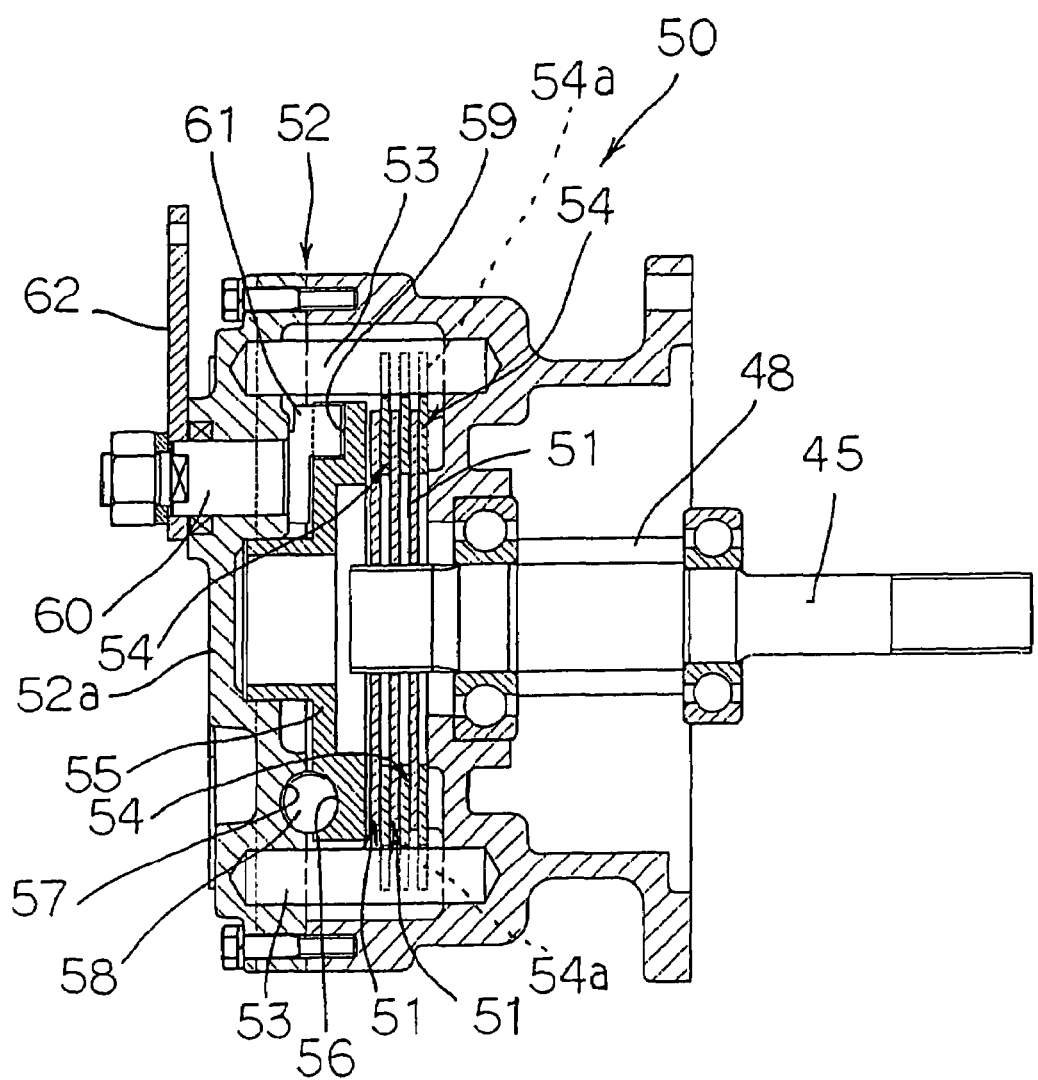
FIG. 6 is a cross-sectional view of a multi-disk brake device.
Figure 7:
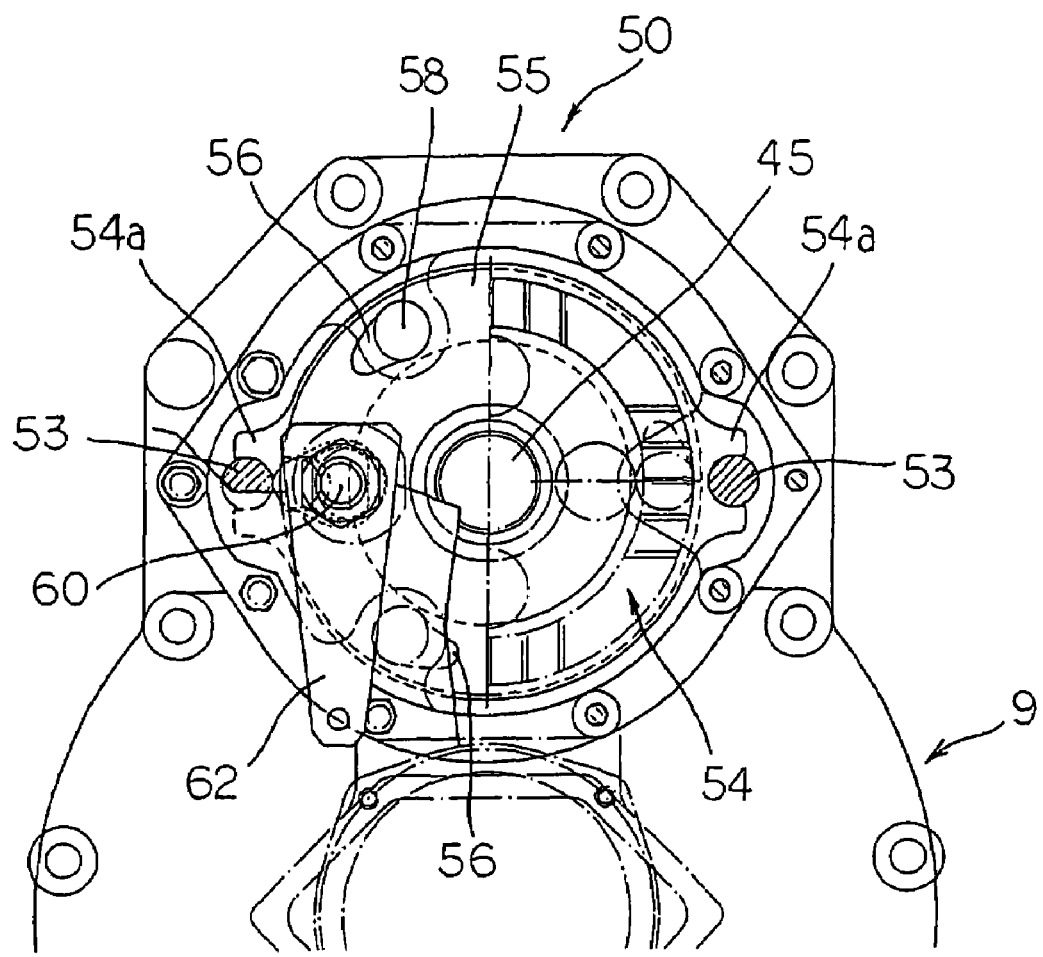
FIG. 7 is an explanatory side view with a part broken away of the multi-disk brake device.

That is, in the multiple-disk brake device 50, as shown in FIG. 6 and FIG. 7, to an outer peripheral surface of a distal end portion (outer end portion) of the output shaft 45, a plurality of (three in this embodiment) rotary-side discs 51 which is integrally rotated with the output shaft 45 is mounted. On the other hand, in the inside of the casing body 52 which covers the rotary-side discs 51, a plurality of (two in this embodiment) disc support members 53,53 which extends in the lateral direction in parallel to the output shaft 45 is arranged on a periphery of the output shaft 45. Further, peripheral portions of a plurality of (three in this embodiment) of fixed-side discs 54 are positioned and supported by these disc support members 53, 53 thus arranging the fixed-side discs 54 on the periphery of the output shaft 45 in a fixed state.

Here, two disc support members 53,53 are arranged on the same circumference and at positions in a point symmetry about the output shaft 45. The fixed-side discs 54 are formed in a ring shape and, at the same time, a pair of engaging members 54a, 54a which are formed in a bifurcated manner is mounted on a peripheral portion in a projecting manner at positions in a point symmetry. The fixed-side discs 54 are positioned and supported by allowing the respective engaging members 54a, 54a to be engaged with the respective disc support members 53, 53 which correspond to the engaging members 54a, 54a.

In this manner, the fixed-side discs 54 can be easily and accurately positioned and supported by engaging the engaging members 54a, 54a with two disc support members 53, 53 and hence, it is unnecessary to perform the forming of the inner peripheral surface of the casing body 52, it is possible to accurately position and support the fixed-side discs 54 with the simple constitution, and it is also possible to realize the reduction of a manufacturing cost and the enhancement of the assembling efficiency.

Further, on the outside of the rotary-side discs 51, a pusher 55 is rotatably and pivotally supported on a side wall 52a of the casing body 52 coaxially with the output shaft 45. On an outer-surface peripheral portion of the pusher 55, a plurality of (three in this embodiment) guide grooves 56a is formed in a state that a width thereof is gradually narrowed along the circumferential direction. On the other hand, in an inner surface of the side wall 52a of the casing body 52, ball engaging recessed portions 57 are formed. Balls 58 are interposed between the ball engaging recessed portions 57 and the above-mentioned guide grooves 56 in a state that the balls 58 are engaged with the ball engaging recessed portions 57 and the guide grooves 56.

In such a constitution, when the pusher 55 is rotated, the balls 58 are moved in the direction that the pusher 55 pushes the rotary-side discs 51 by way of the guide grooves 56 and hence, the rotary-side discs 51 and the fixed-side discs 54 are brought into face contact with each other in a pressed state whereby it is possible to brake the rotation of the output shaft 45.

Further, an engaging recessed portion 59 is formed in an outer surface of the pusher 55, while an engaging member 61 is mounted on an inner end portion of a rotary manipulation shaft 60 which is allowed to penetrate in the lateral direction and is pivotally supported on the side wall 52a of the casing body 52, the engaging member 61 is engaged with the above-mentioned engaging recessed portion 59. Further, an operating arm 62 is continuously formed on an outer end portion of the rotary manipulation shaft 60 and a brake pedal 161 (162) formed on the driving portion 6 described later is interlockingly connected with the operating arm 62.

Due to such a constitution, when the operator performs a step-in manipulation of the brake pedal 161 (162), the rotary manipulation shaft 60 is rotated in the clockwise direction in a side view shown in FIG. 7 by way of the operating arm 62, the engaging member 61 rotates the pusher 55 in the clockwise direction by way of the engaging recessed portion 59, the pusher 55 is moved in the direction which allows the balls 58 to push the rotary-side disc 51 by way of the guide groove 56, and the rotary-side disc 51 and the fixed-side disc 54 are brought into pressure surface contact with each other thus braking the rotation of the output shaft 45.

[Explanation of PTO Transmission Portion 5]

The PTO transmission portion 5 is, as shown in FIG. 1 to FIG. 3, interlockingly and continuously mounted on a rear wall portion of the differential case 34 of the above-mentioned transmission portion 4, and a PTO transmission mechanism 64 which constitutes a part of the above-mentioned PTO-system power transmission mechanism is arranged in the inside of the PTO transmission case 63. Further, a PTO shaft 89 which forms a terminal portion (rear end portion) of the PTO transmission mechanism 64 is projected rearwardly. Numeral 90 indicates a PTO transmission lever.

Figure 20:
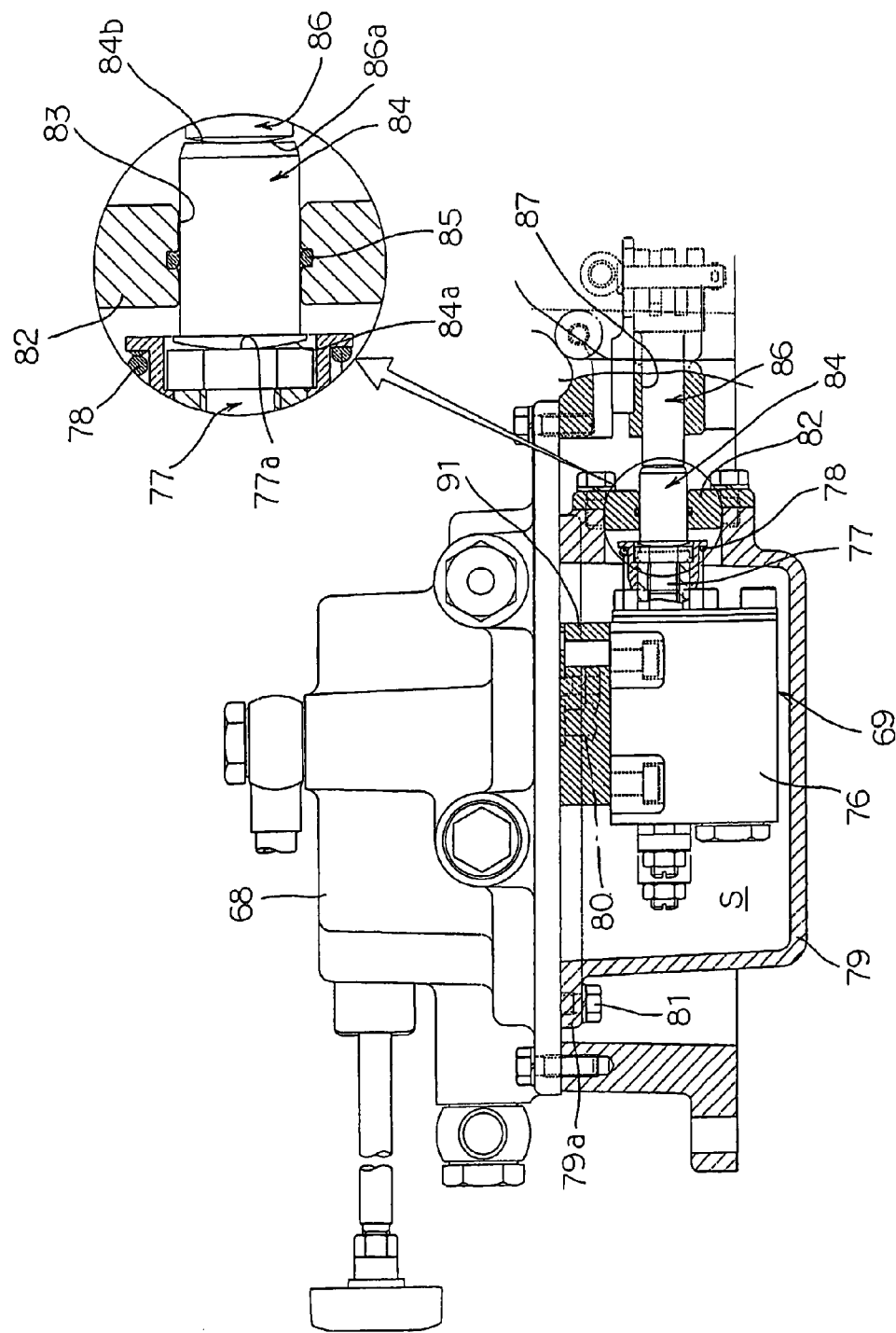
FIG. 20 is an explanatory cross-sectional side view showing a sub spool.

Further, in the above-mentioned differential case 34, as shown in FIG. 3, an opening portion 65 for maintenance is formed in a ceiling portion and, as shown in FIG. 2, a ring-shaped lift arm support body 66 is detachably mounted on a peripheral portion of the opening portion 65. A cylindrical hydraulic circuit body support member 67 having short width is formed vertically on a front portion of the lift arm support body 66, and a hydraulic circuit body 68 is detachably mounted on the hydraulic circuit body support member 67. As shown in FIG. 20, a hydraulic control valve 69 is mounted on the hydraulic circuit body 68. Here, in this embodiment, a hydraulic circuit body 68 and a hydraulic control valve 69 are mounted as hydraulic equipment.

Figure 4:
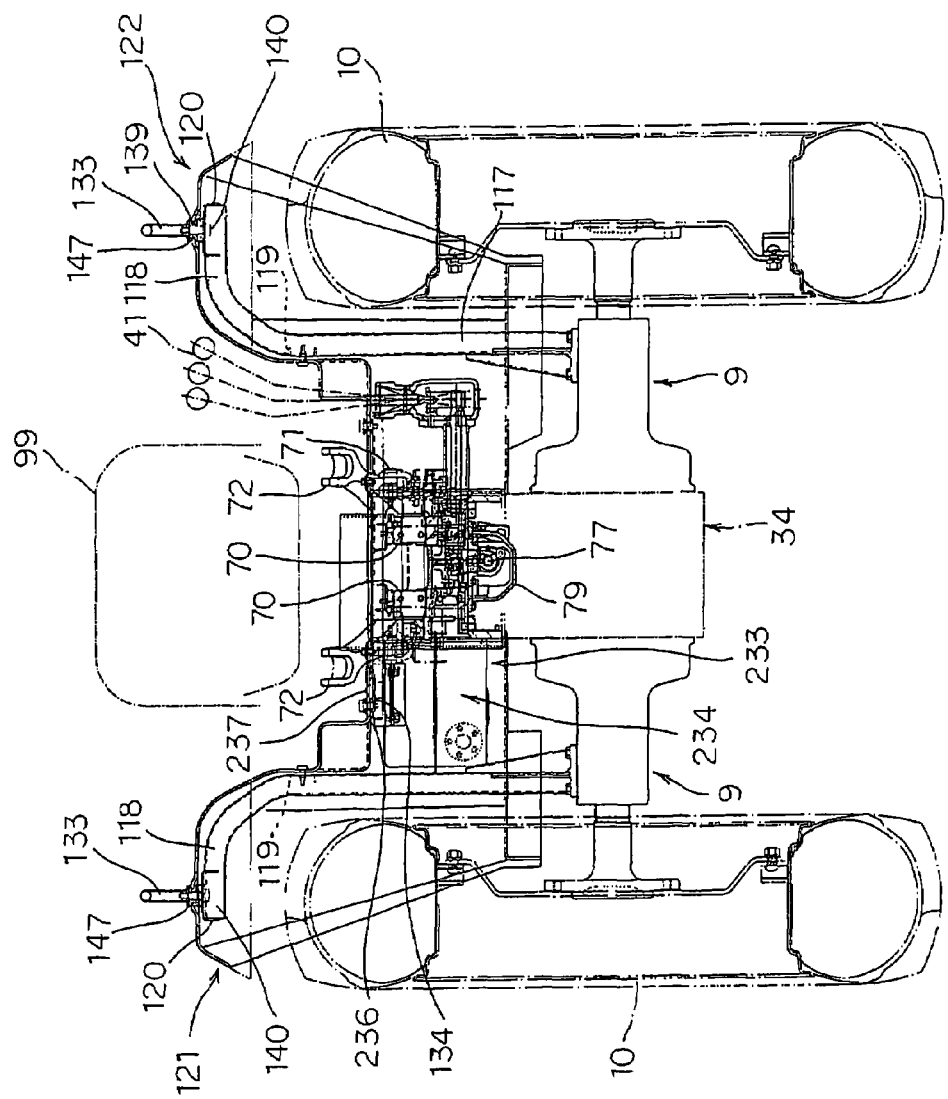
FIG. 4 is an explanatory back view of the tractor.

In the lift arm support body 66, as shown in FIG. 2 to FIG. 4, a pair of left and right pivotally supporting members 70, 70 is formed in a vertically extending manner and a lift arm support shaft 71 which extends in the lateral direction has both ends thereof supported on the pivotally supporting members 70, 70 in a state that the lift arm support shaft 71 penetrates the pivotally supporting members 70, 70. Proximal end portions of a pair of left and right lift arms 72, 72 are mounted on the left-side and right-side end portions of the lift arm support shaft 71, while lift cylinders 73, 73 which perform the extending and retracting operation in the vertical direction are interposed between intermediate portions of the respective lift arms 72, 72 and the lower portions of left-side and right-side walls of the above-mentioned PTO transmission case 63. Numerals 74, 75 indicate cylinder connecting pins.

The hydraulic control valve 69 includes, as shown in FIG. 20, a valve body 76 and a spool 77 which is interlockingly connected with the valve body 76, wherein the valve body 76 is mounted on a lower surface of the hydraulic circuit body 68 by way of a spacer 91 in state that the valve body 76 extends vertically downwardly from the lower surface, and the spool 77 extends rearwardly than the valve body 76.

Here, the spool 77 is resiliently biased by a compression spring 78 in the direction that the spool 77 projects rearwardly.

Further, a valve cover body 79 is mounted on a lower surface of the above-mentioned hydraulic circuit body 68, a hydraulic control valve 69 is accommodated in the inside of the valve cover body 79, and a drain in the hydraulic control valve 69 can be discharged by way of a drain receiving space S formed in the inside of the valve cover body 79 through a tank-side return longitudinal oil passage 80 which constitutes a drain circuit.

Further, the drain receiving space S is configured to collect drains discharged through respective valves formed in the hydraulic circuit body 68 therein.

Here, the valve cover body 79 is formed in a box shape with an opened upper surface and has an upper-end peripheral portion thereof 79a mounted on a lower surface of the hydraulic circuit body 68 hermetically using bolts 81. One portion of a rear wall of the valve cover body 79 is formed of a sealing member 82 having the sealing structure. A sub spool projecting hole 83 which opens in the fore-and-aft direction is formed in a center portion of the sealing member 82. A rod-like sub spool 84 which has an axis thereof directed in the fore-and-aft direction is slidably inserted in the sub spool projecting hole 83 in the fore-and-aft direction. Numeral 85 indicates a seal ring.

Hereinafter, the constitution of the sub spool 84 is explained in conjunction with FIG. 20.

(Explanation of Sub Spool 84)

That is, the sub spool 84 brings a front end surface 84a thereof into contact with a rear end surface (distal end surface) 77a of the above-mentioned spool 77 and brings a rear end surface 84b thereof into contact with a front end surface 86a of the spool operating member 86 formed on a rear portion of the hydraulic circuit body support member 67. The spool operating member 86 is formed in a rod shape which has an axes thereof directed in the fore-and-aft direction, and is slidably inserted into an operating-member inserting hole 87 formed in a rear portion of the hydraulic circuit body support member 67.

Further, the spool 77, the sub spool 84 and the spool operating member 86 are arranged on the substantially same axial line which extends in the fore-and-aft direction.

Further, to the spool operating member 86, an elevating/lowering lever (not shown in the drawing) which performs the elevating/lowering operation of the lift arms 72, 72 is interlockingly connected and, at the same time, between the spool operating member 86 and the left-side lift arm 72, as shown in FIG. 2 and FIG. 3, a feedback link mechanism 88 is interposed. Due to such a constitution, the lift arms 72, 72 are elevated, lowered or stopped by the feedback link mechanism 88.

That is, when the elevation manipulation is performed by rearwardly rotating the elevation/lowering lever, the spool operating member 86 is slidably moved in the frontward direction and hence, the spool 77 is slidably moved in the frontward direction against the resilient biasing force of the compression spring 78 by way of the sub spool 84.

As a result, the valve body 76 performs the valve-opening operation toward the elevation side, a pressurized oil is supplied to the lift cylinders 73, 73 under pressure, and both lift cylinders 73, 73 are operated in an extended manner, and the lift arms 72, 72 which are interlockingly connected with the respective lift cylinders 73, 73 are rotated for elevation.

Then, the feedback link mechanism 88 is interlockingly operated with the elevational rotation of the lift arms 72, 72. When the frontward slide movement of the spool operating member 86 is released due to the feedback link mechanism 88, the spool 77 is slidably moved rearwardly due to the resilient biasing force of the compression spring 78. At a point of time that the spool 77 returns to the neutral position, the valve body 76 performs the valve-closing operation so as to stop the inflow of the pressurized oil (working oil) into the lift cylinders 73, 73.

As a result, the lift arms 72, 72 assume a posture in which the lift arms 72, 72 are hydraulically locked at an elevational rotation position and the posture is held.

Further, when the lowering manipulation is performed by frontwardly rotating the elevation/lowering lever, the spool operating member 86 is slidably moved in the rearward direction and hence, the spool 77 is slidably moved in the rearward direction against the resilient biasing force of the compression spring 78.

As a result, the valve body 76 performs the valve-opening operation toward the lowering side, a pressurized oil which is supplied to the lift cylinders 73, 73 under pressure flows out, and both lift cylinders 73, 73 are operated in a contracted manner, and the lift arms 72, 72 which are interlockingly connected with the respective lift cylinders 73, 73 are rotated for lowering.

Then, the feedback link mechanism 88 is interlockingly operated with the lowering rotation of the lift arms 72, 72. When the rearward slide movement of the spool operating member 86 is released due to the feedback link mechanism 88, the spool 77 is slidably moved frontwardly against the resilient biasing force of the compression spring 78. At a point of time that the spool 77 returns to the neutral position, the valve body 76 performs the valve-closing operation so as to stop the flow-out of the pressurized oil from the lift cylinders 73, 73.

As a result, the lift arms 72, 72 assume a posture in which the lift arms 72, 72 are hydraulically locked at a lower rotation position and the posture is held.

Here, in this embodiment, a sealing member 82 having the seal structure is mounted on the valve cover body 79, a sub spool projecting hole 83 is formed in the sealing member 82, a sub spool 84 penetrates the sub spool projecting hole 83, and the sub spool 84 is interposed between the spool 77 formed in the hydraulic control valve 69 and the spool operating member 86. Accordingly, even when the accuracy of concentricity between the spool 77 and the sub spool projecting hole 83 becomes more or less eccentric due to a mounting error of the hydraulic control valve 69, it is possible to ensure the favorable slide operation of the sub spool 84 in the sub spool projecting hole 83 whereby it is possible to surely transmit an operational force of the spool operating member 86 to the spool 77 by way of the sub spool 84.

Accordingly, it is possible to ensure the favorable hydraulic control performed by the hydraulic control valve 69.

Further, in this embodiment, as shown in FIG. 20, a front end surface 84a of the sub spool 84 which comes into contact with the spool 77 is formed in an arcuate surface which bulges frontwardly.

Since the front end surface 84a of the sub spool 84 which forms the contact face is formed in an arcuate surface which bulges frontwardly. Accordingly, even when the accuracy of concentricity between the spool 77 and the sub spool projecting hole 83 becomes more or less eccentric due to a mounting error of the hydraulic control valve 69, it is possible to surely transmit an operating force of the spool operating member 86 from the sub spool 84 to the spool 77 by way of the contact surface whereby it is possible to more favorably ensure the hydraulic control attributed to the hydraulic control valve 69.

Here, a rear end surface 77a of the spool 77 which forms a contact surface with the sub spool 84 is formed in an arcuate shape which bulges rearwardly and hence, it is also possible to obtain the similar advantageous effects.

Further, a front end surface 86a of the spool operating member 86 which forms a contact surface with the sub spool 84 is formed in an arcuate shape which bulges frontwardly.

In this manner, even when the accuracy of concentricity between the spool operating member 86 and the sub spool projecting hole 83 becomes more or less eccentric due to a mounting error of the hydraulic control valve 69, it is possible to surely transmit the operating force of the spool operating member 86 to the sub spool 84 by way of the contact surface whereby it is possible to more favorably ensure the hydraulic control attributed to the hydraulic control valve 69.

[Explanation of Driving Portion 6]

In the driving portion 6, as shown in FIG. 1, a dashboard 95 is mounted in an erected manner so as to close a rear-end opening portion of the bonnet 19 formed on the prime mover portion 2, a meter panel 96 is mounted on an upper end portion of the dashboard 95, a steering wheel support shaft 97 projects upwardly from the meter panel 96, a steering wheel 98 is mounted on an upper end portion of the steering wheel support shaft 97, and a driver's seat 99 is arranged at a position behind the steering wheel 98 and right above the transmission portion 4.

Figure 8:
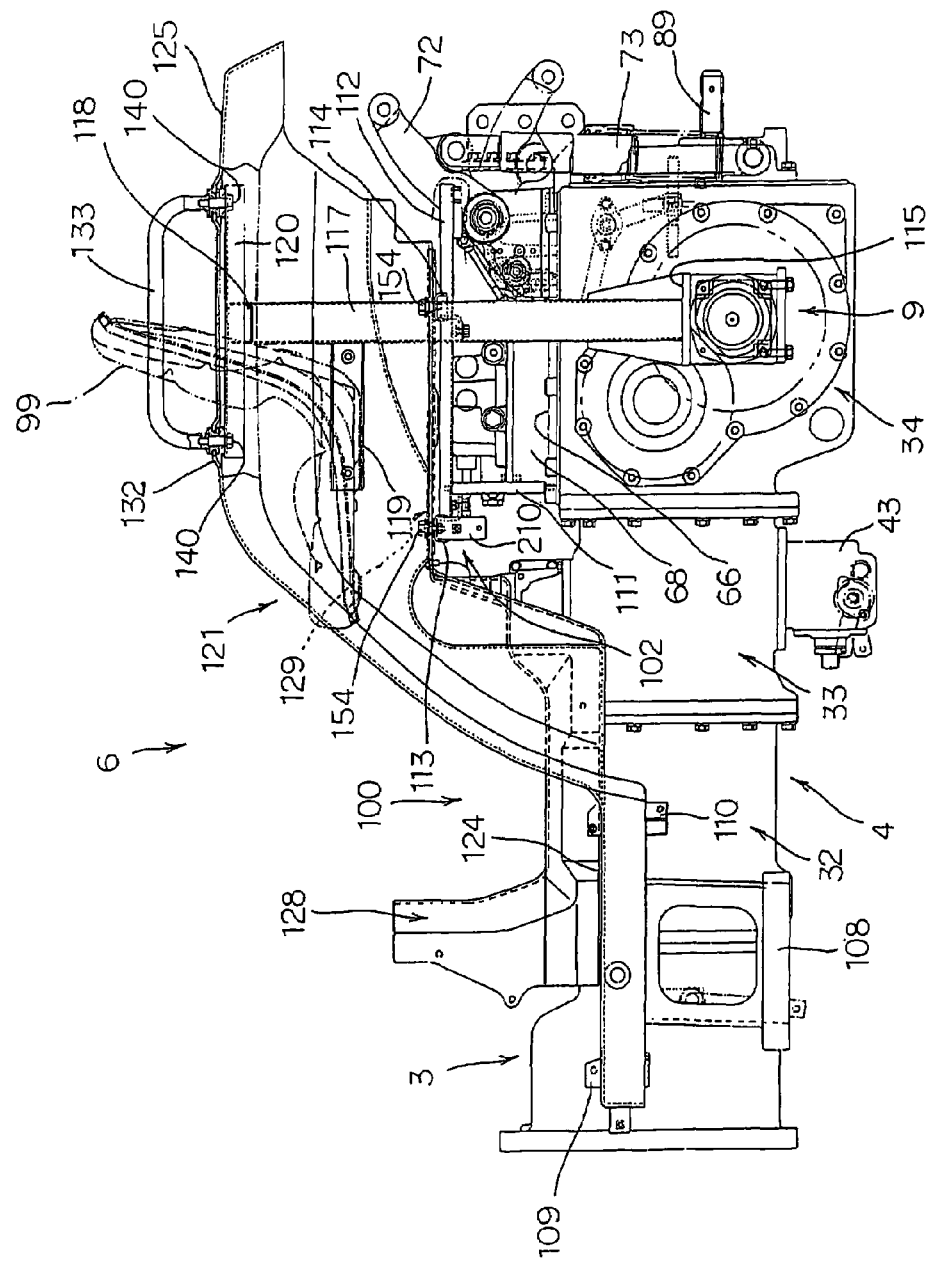
FIG. 8 is a side view showing the mounting structure of a cover body.
Figure 9:
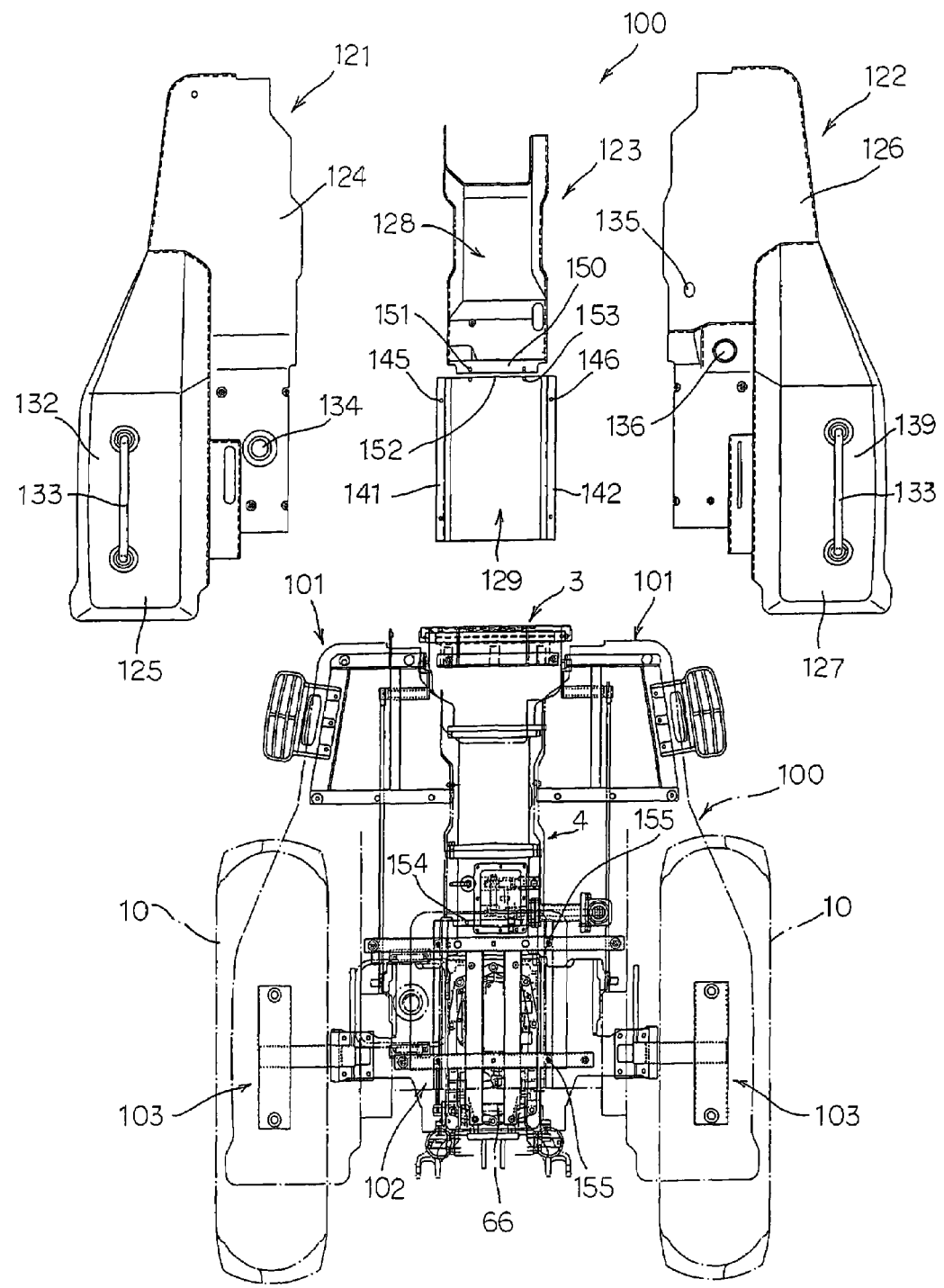
FIG. 9 is an exploded explanatory plan view showing the mounting structure of the cover body.

Further, as shown in FIG. 1 and FIG. 8, a cover body 100 is extended over the driving portion 6, the transmission portion and the left-side and right-side rear wheels so as to form the step portion of the driving portion 6 using the cover body 100. Further, the cover body 100 covers the transmission portion 4 from above and, at the same time, covers the left-side and right-side rear wheels 10, 10 from a front side and from above. The cover body 100 is, as shown in FIG. 9, supported on a pair of left and right front support frame bodies 101, 101, a rear portion support frame body 102, and a pair of left and right fender portion support bodies 103, 103.

First of all, the constitution of the pair of left and right front support frame bodies 101, 101, the rear portion support frame body 102, and the pair of left and right fender portion support bodies 103, 103 is explained. Thereafter, the cover body 100 is explained.

(Explanation of Front Support Frame Body 101)

Figure 10:
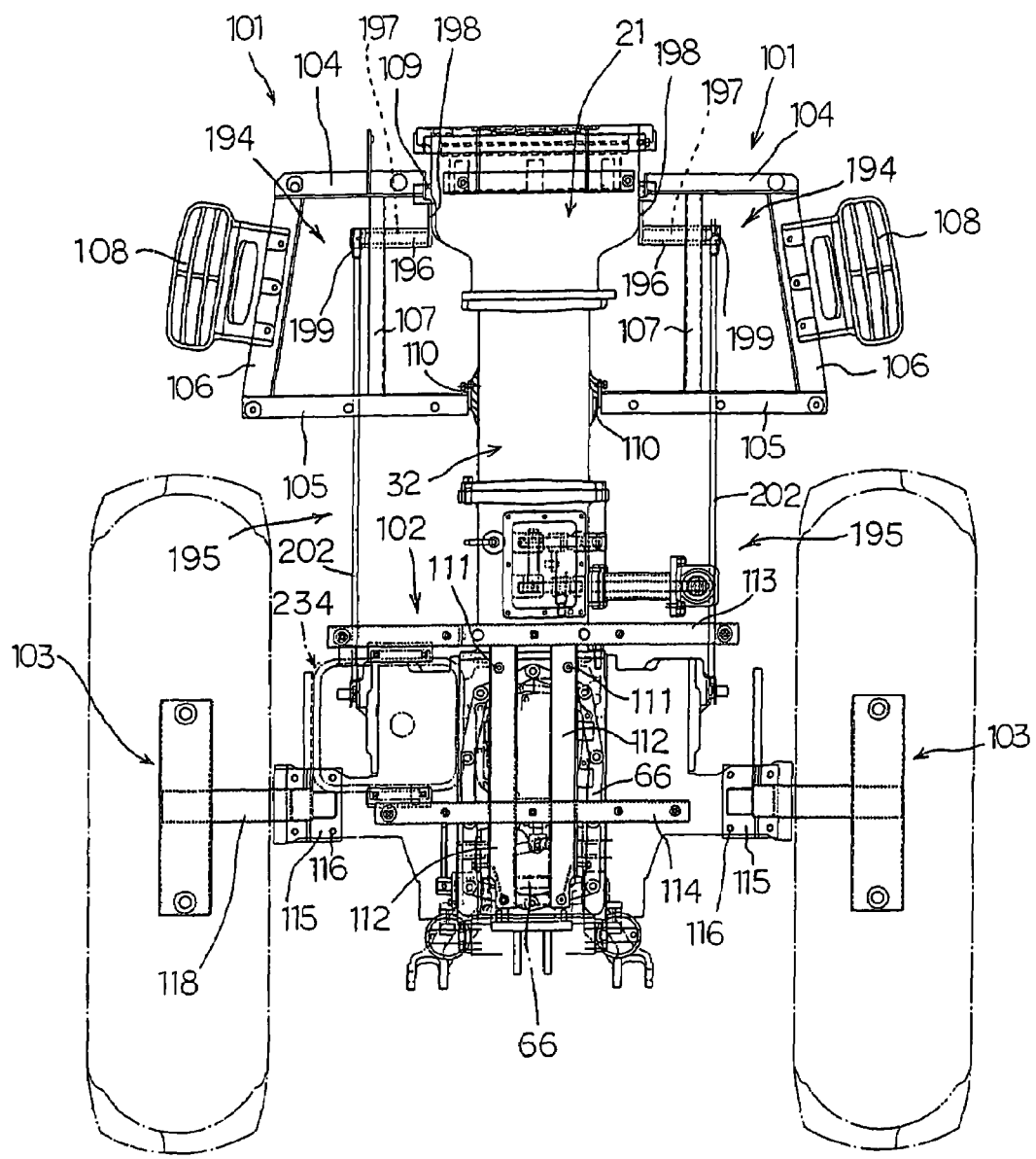
FIG. 10 is a plan view showing a support frame body of the cover body.

That is, a pair of left-side and right-side front support frame bodies 101, 101 is, as shown in FIG. 10, formed in a state that front support frames bodies 101, 101 project outwardly substantially horizontally from the clutch housing 21 and the left-side and right-side walls of the main transmission case 32, and function as step portion support bodies which support the step portions made of synthetic resin.

Further, the left-side front support frame 101 is, as shown in FIG. 8 and FIG. 10, constituted of a front support frame forming member 104 which is formed in a state that the front support frame forming member 104 has a proximal end portion (right-side end portion) thereof mounted on the left side wall of the clutch housing 21 by way of a front mounting bracket 109 and extends to the left side outwardly, a rear support frame forming member 105 which is formed in a state that the rear support frame forming member 105 has a proximal end portion (right-side end portion) thereof mounted on the left side wall of the main transmission case 32 by way of a rear mounting bracket 110 and extends to the left side outwardly than the support frame forming member 104, an outer support frame forming member 106 which extends in the fore-and-aft direction and also extends between distal end portions (left-side end portions) of both of front and rear support frame forming members 104, 105, and an intermediate support frame forming member 107 which extends in the fore-and-aft direction and also extends between intermediate portions of both of front and rear support frame forming members 104, 105. Numeral 108 indicates an auxiliary step body mounted on the outer support frame forming member 106.

Further, the right-side front support frame body 101 is configured to assume a left-and-right symmetry with the above-mentioned left-side front support frame body 101.

(Explanation of Rear Support Frame Body 102)

Figure 12:
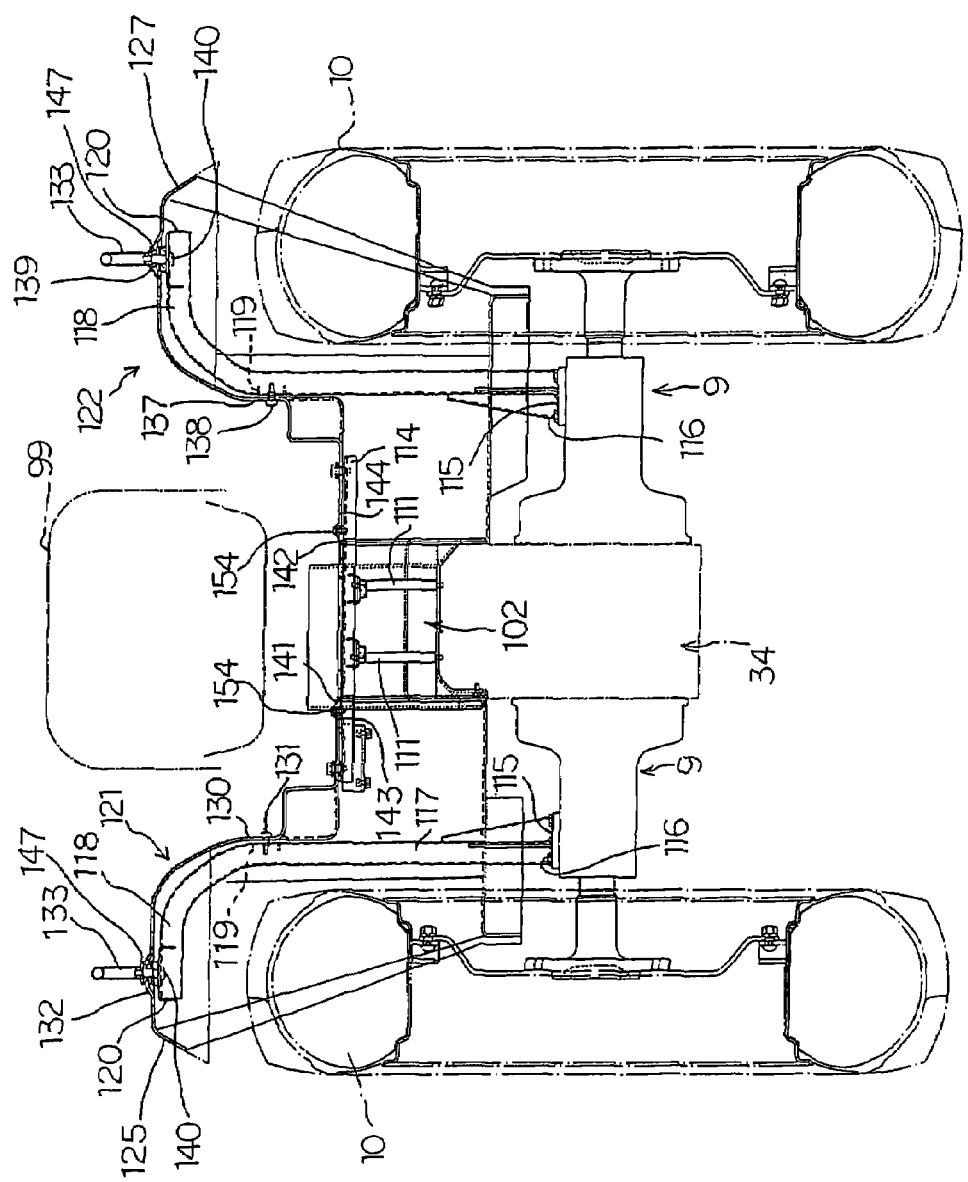
FIG. 12 is an explanatory back view showing the mounting structure of the cover body.

That is, the rear support frame body 102 is, as shown in FIG. 8, FIG. 10 and FIG. 12, configured in a stereoscopic manner such that support columnar members 111, 111 which extend vertically are mounted on left-side and right-side front portions of the ring-shaped lift arm support body 66 in an erected manner, respective front portions of the left-side and right-side support frame forming members 112, 112 which extend in the fore-and-aft direction are supported on respective upper end portions of the support columnar members 111, 11 which face each other in the lateral direction, and front and rear support frame forming members 113, 114 which extend in the lateral direction are extended between front end portions and between rear end portions of both of left-side and right-side support frame forming members 112, 112 thus constituting a stereoscopic constitution.

(Explanation of Fender Portion Support Body 103)

That is, the left-side fender portion support body 103 is, as shown in FIG. 8, FIG. 10 and FIG. 12, configured such that a fixed plate 115 is fixed to an upper surface of a left-side end portion of the left-side rear axle case 9 using fixing bolts 116, and a lower end portion of a straight support member 117 which vertically extends straightly is fixedly mounted on the fixed plate 115, the straight support member 117 has an upper end portion thereof extended outwardly in a curved shape thus forming a curved support member 118, a fender side-surface support member 119 extends frontwardly from the upper end portion of the straight support member 117, and an intermediate portion of the fender upper-surface support member 120 which extends in the fore-and-aft direction is continuously formed on a distal end portion of the curved support member 118.

Further, the right-side fender portion support body 103 is configured to assume a left-and-right symmetry with the above-mentioned left-side fender portion support body 103.

Next, the constitution of the cover body 100 which is supported on the above-mentioned front and rear support frame bodies 101, 101, 102 and the fender portion support bodies 103, 103 is explained in conjunction with FIG. 8, FIG. 9, FIG. 11 and FIG. 12.

(Explanation of Cover Body 100)

That is, the cover body 100 is, as shown in FIG. 9, divided and formed of left-side and right-side cover forming bodies 121, 122 and an intermediate cover forming body 123 which is arranged between the left-side and right-side cover forming bodies 121, 122 and, at the same time, the respective forming bodies 121, 122, 123 are detachably mounted on the above-mentioned pair of left and right front support frame bodies 101, 101 and the rear support frame body 102, and the pair of left and right fender portion support bodies 103, 103.

Figure 11:
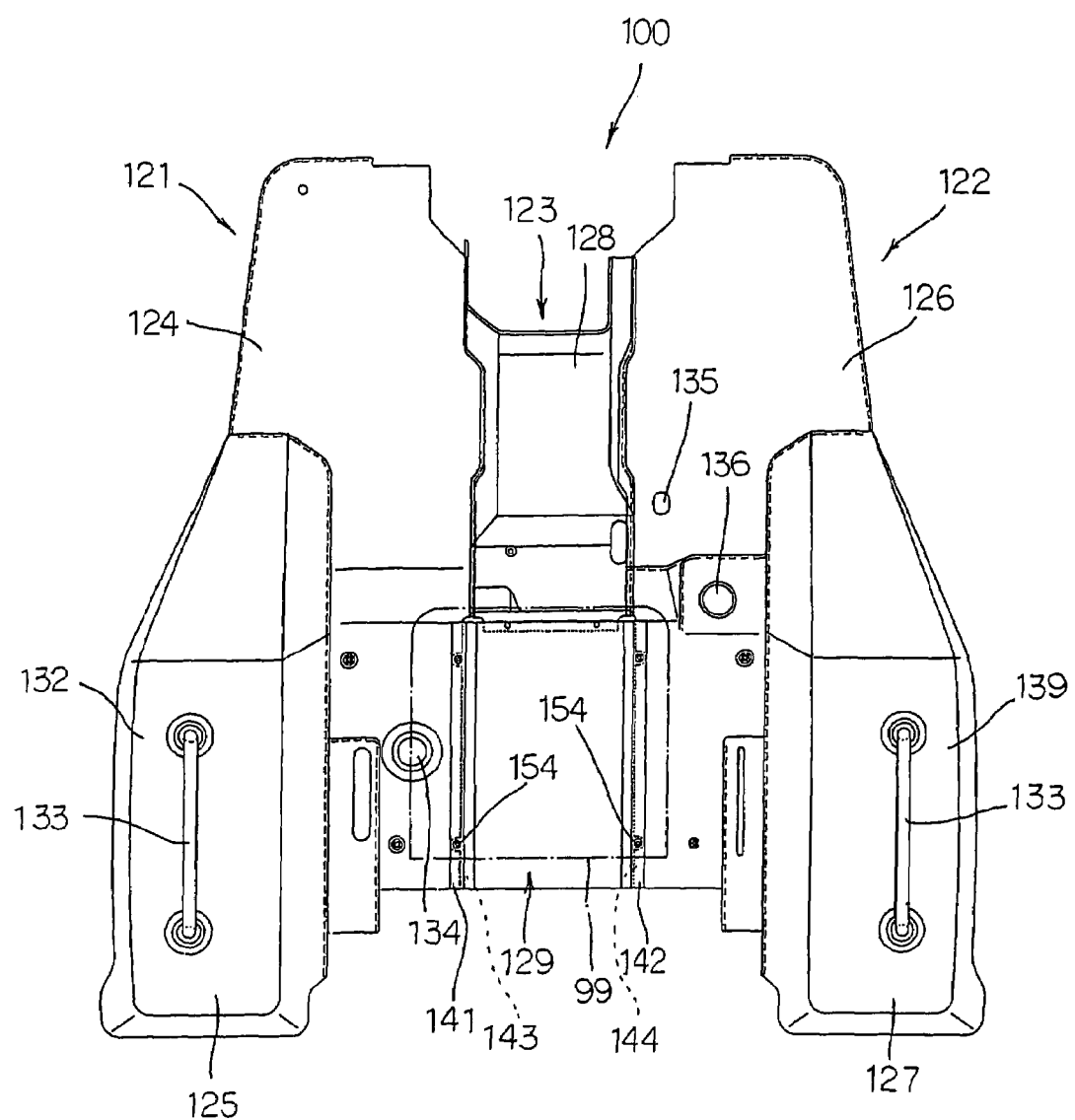
FIG. 11 is a plan view showing the cover body.

Further, the left-side cover forming body 121 is, as also shown in FIG. 8 and FIG. 11, integrally formed of a left-side step forming member 124 which forms a left-side portion of the step portion and a left-side fender forming member 125 which covers the left-side rear wheel 10 from the front side and from above using synthetic resin such as light-weighted FRP or the like. Numeral 134 indicates an oil filling port insertion hole.

Further, the left-side cover forming body 121 is detachably mounted on the left-side front support frame body 101, the left-side portions of the front and rear support frame forming members 113, 114 of the rear support frame body 102, and the left-side fender portion support body 103 using mounting bolts.

Here, as shown in FIG. 12, the side wall 130 of the left-side fender forming member 125 is mounted on the fender side surface support member 119 formed on the fender portion support body 103 using mounting bolts 131, an upper surface portion 132 of the left-side fender forming member 125 is mounted on the fender upper surface support member 120 formed on the fender portion support body 103 by way of a vibration-proof member 147, and an auxiliary handrail portion 133 which is formed in a gate shape in a side view is firmly mounted on the upper surface portion 132 using mounting bolts 140.

In this manner, the upper surface portion 132 and the auxiliary handrail portions 133 of the left-side fender forming member 125 can be integrally and firmly mounted on the fender upper surface support member 120 and, at the same time, for example, in a plow operation or the like, when an operator has to perform the operation in a state that his upper half body is turned rearwardly to observe a rear portion or when the operator has to perform the operation in a state that his body is inclined at the time of performing the operation in an inclined land or the like, the operator can perform the operation in a stable state by gripping the auxiliary handrail portions 133 which are firmly mounted on the fender portion support body 103.

Further, the right-side cover forming body 122 is integrally formed of a right-side step forming member 126 which forms a right-side portion of the step portion and a right-side fender forming member 127 which covers the right-side rear wheel 10 from the front side and from above using synthetic resin such as light-weighted FRP or the like. Numeral 135 indicates differential lock pedal arm insertion hole and numeral 136 indicates a main transmission lever insertion hole.

Further, the right-side cover forming body 122 is detachably mounted on the right-side front support frame body 101, the right-side portions of the front and rear support frame forming members 113, 114 of the rear support frame body 102, and right-side fender portion support body 103 using mounting bolts.

Here, the side wall 137 of the right-side fender forming member 127 is mounted on the fender side surface support member 119 formed on the fender portion support body 103 using mounting bolts 138, an upper surface portion 139 of the right-side fender forming member 127 is mounted on fender upper surface support member 120 formed on the fender portion support body 103 by way of a vibration-proof member 147, and an auxiliary handrail portion 133 which is formed in a gate shape in a side view is firmly mounted on the upper surface portion 139 using mounting bolts 140.

In this manner, the upper surface portion 139 and the auxiliary handrail portions 133 of the right-side fender forming member 127 can be integrally and firmly mounted on the fender upper surface support member 120 and, at the same time and, for example, in a plow operation or the like, when an operator has to perform the operation in a state that his upper half body is turned rearwardly to observe a rear portion or when the operator has to perform the operation in a state that his body is inclined at the time of performing the operation in an inclined land or the like, the operator can perform the operation in a stable state by gripping the auxiliary handrail portions 133 which are firmly mounted on the fender portion support body 103.

Further, since the auxiliary handrail portion is mounted on the fender portion support body 103, it is possible to reduce the number of parts.

Still further, since the left-side and right-side fender forming members 125, 127 are supported on the upper end portions of the fender portion support bodies 103, 103, it is possible to firmly support the respective fender forming members 125, 125.

Accordingly, the operator can easily get on and off the driving portion by gripping the respective fender forming members 125, 127 with his hands.

The intermediate cover forming body 123 forms a center portion of the stepped portion and is divided into a center step forming member 128 which covers an upper surface of a rear portion of the clutch housing 21, an upper surface of the main transmission case 32 and an upper surface of the sub transmission case 33, and a transmission portion covering member 129 which covers the transmission portion 4 from above.

Further, as shown in FIG. 9, the center step forming member 128 is made of synthetic resin such as light-weighted FRP or the like, while the transmission portion covering member 129 is made of a rigid material such as iron and is formed in a quadrangular shape which is longitudinally elongated in the fore-and-aft direction. Further, the transmission portion covering member 129 is configured such that, as shown in FIG. 11 and FIG. 12, left and right side peripheral portions 141, 142 are bent upwardly. That is, both left and right side peripheral portions 141, 142 are upwardly offset by an amount of wall thickness of inner end peripheral portions 143, 144 of the left and right side fender forming members 125, 127. In FIG. 9, numerals 145, 146 respectively indicate bolt holes.

Further, as shown in FIG. 9, bolt holes 151, 151 are formed in a rear end peripheral portion 150 of the center step forming member 128, while bolt holes 153, 153 which are aligned with the above-mentioned bolt holes 151, 151 in the vertical direction are also formed in front end peripheral portion 152 of the transmission portion covering member 129. By overlapping the front end peripheral portion 152 of the transmission portion covering member 129 to the rear end peripheral portion 150 of the center step forming member 128, and these members are integrally mounted on the front support frame forming member 113 using the mounting bolts 154.

Then, in mounting the cover body 100, the left and right cover forming bodies 121, 122 are firstly mounted. Then, the center step forming member 128 is mounted, and finally, the transmission portion covering member 129 is mounted.

Here, the transmission portion covering member 129 is integrally mounted on the front and rear support frame forming members 113, 114 using mounting bolts 154, 155 in a state that the left and right peripheral portions 141, 142 of the transmission portion covering member 129 are overlapped to the inner end peripheral portions 143, 144 at rear portions of the left and right fender forming members 125, 127 and, at the same time, the front end peripheral portion 152 of the transmission portion covering member 129 is overlapped to the rear end peripheral portion 150 of the center step forming member 128.

Further, by removing the mounting bolts 154, 155, it is possible to remove the transmission portion covering member 129 which requires the relatively frequent replacement without being influenced by the left and right fender forming members 125, 127 and the center step forming member 128.

In this manner, the cover body 100 is dividedly formed in the left and right cover forming bodies 121, 122 and the intermediate cover forming body 123 arranged between the left and right cover forming bodies 121, 122 and, at the same time, the respective forming bodies 121, 122, 123 are respectively detachably mounted on the pair of left and right front support frame bodies 101, 101, the rear support frame body 102 and the pair of left and right fender portion support bodies 103, 103 and hence, in performing the operation such as the maintenance or the like, it is possible to remove only the forming body which requires the replacement thereof whereby the operation such as maintenance can be efficiently performed.

Here, although the hydraulic equipment and the like which require the frequent maintenance are arranged above the transmission portion 4, the transmission portion covering member 129 which covers the transmission portion 4 from above is dividedly formed from the center step forming member 128 and hence, it is possible to remove only the transmission portion covering member 129 when necessary whereby the maintenance of the hydraulic equipment or the like can be speedily and easily performed.

Further, the transmission portion covering member 129 which covers the transmission portion 4 is formed of a rigid member and portions of the cover body 100 other than the transmission portion covering member 129 are formed by molding using synthetic resin, it is possible to impart the required rigidity to the transmission portion covering member 129 which supports the driver's seat 99 and, at the same time, it is possible to make most of other portions light-weighted while ensuring the required strengths.

Further, in the driving portion 6, a clutch pedal 160 and left and right brake pedals 161, 162 are arranged in a state that the clutch pedal 160 and left and right brake pedals 161, 162 are positioned on both of left and right sides of the dashboard 95. Hereinafter, the constitution of the clutch pedal 160 is explained and, thereafter, the constitution of the left and right brake pedals 161, 162 is explained.

(Explanation of Clutch Pedal 160)

That is, the clutch pedal 160 is a manipulating means of the above-mentioned traveling clutch 25. As shown in FIG. 1, FIG. 2, FIG. 13 and FIG. 14, a pedal support frame body 164 is mounted on a ceiling portion 163 of the clutch housing 21, a cylindrical shaft support body 165 having an axis thereof directed in the lateral direction is extended within and supported by the pedal support frame body 165, a pedal support shaft 166 is allowed to penetrate the cylindrical shaft support body 165, and a proximal end portion of a pedal arm 168 is mounted on a left-side projecting end portion of the pedal support shaft 166 by way of a first boss portion 167, and a distal end portion of the pedal arm 168 is extended rearwardly and downwardly and a pedal body 169 is mounted on the distal end portion.

Here, as shown in FIG. 2, in the inside of the clutch housing 21, a cylindrical traveling clutch operating body 170 is slidably fitted on an outer peripheral surface of the above-mentioned outer drive shaft 24 in a state that the traveling clutch operating body 170 is movable in the fore-and-aft direction, a clutch operating member 171 is mounted on a front end peripheral portion of the traveling clutch operating body 170, and the clutch operating member 171 is arranged close to a power receiving arm 25a of the traveling clutch 25 in a state that the clutch operating member 171 faces the power receiving arm 25a in an opposed manner.

Then, a traveling clutch connecting mechanism 172 is interposed between a rear end portion of the traveling clutch operating body 170 and a first boss portion 167 which supports the above-mentioned clutch pedal 160.

That is, in the traveling clutch connecting mechanism 172, to a distal end portion of a clutch interlockingly operating arm 173 which is mounted on the first boss portion 167 in a rearwardly extending manner, an upper end portion of a connecting rod 174 which extends vertically is connected, while to a lower end portion of the connecting rod 174, a distal end portion of an outer interlockingly operating arm 176 which is mounted on a left side wall of the clutch housing 21 by way of an arm support shaft 175 is connected.

Further, the arm support shaft 175 is allowed to penetrate a left wall of the clutch housing 21 with an axis thereof directed in the lateral direction. A proximal end portion of the above-mentioned outer interlockingly operating arm 176 is mounted on an outer end portion of the arm support shaft 175, while a proximal end portion of an inner interlockingly operating arm 177 is mounted on an inner end portion of the arm support shaft 175. With a bifurcated engaging member 178 which is formed on the distal end portion of the inner interlockingly operating arm 177, an engaging pin 179 which is mounted on a rear end portion of the traveling clutch operating body 170 in a projected manner is engaged. Numeral 180 indicates a spring engaging member and numeral 181 indicates a clutch pedal restoring spring.

In this manner, when a step-in manipulation is performed on the clutch pedal 160, the first boss portion 167 is, in a side view shown in FIG. 2, rotated in the clockwise direction and this rotational force is transmitted to the traveling clutch 25 by way of the clutch interlockingly operating arm 173 → the connecting rod 174 → the outer interlockingly operating arm 176 → the arm support shaft 175 → the inner interlockingly operating arm 177 → bifurcated engaging member 178 → the engaging pin 179 → the traveling clutch operating body 170 → the clutch operating member 171 → the power receiving arm 25a → the traveling clutch 25 so as to perform the power transmission and interruption of the traveling clutch 25.

Next, the constitution of the left and right side brake pedals 161, 162 is explained in conjunction with FIG. 1, FIG. 2, FIG. 10, FIG. 13 and FIG. 14.

(Explanation of Left and Right Side Brake Pedals 161, 162)

The left and right side brake pedals 161, 162 are configured such that, as shown in FIG. 1, FIG. 2, FIG. 10, FIG. 13 and FIG. 14, on projecting end portions of the pedal support shaft 166 which penetrates the cylindrical shaft support body 165, proximal end portions of pedal arms 187, 188 are mounted by way of second and third boss portions 185, 186, distal end portions of the respective pedal arms 187, 188 are extended rearwardly and downwardly, the pedal bodies 189, 190 are mounted on respective distal end portions, and both pedal bodies 189, 190 are arranged close to each other in the lateral direction.

Further, the left brake pedal 161 is interlockingly connected with the pedal support shaft 166 by way of the second boss portion 185 which supports the left brake pedal 161, and a left interlocking mechanism 190 is interposed between a left end portion of the pedal support shaft 166 and the multi-disc brake device 50 mounted on an upper portion of the left rear axle case 9.

On the other hand, with respect to the right brake pedal 162, a right interlocking mechanism 192 is interposed between a third boss portion 186 which is pivotally and rotatably supported on the pedal support shaft 166 and the above-mentioned multi-disc brake device 50 mounted on the upper portion of the right rear axle case 9.

Figure 14:
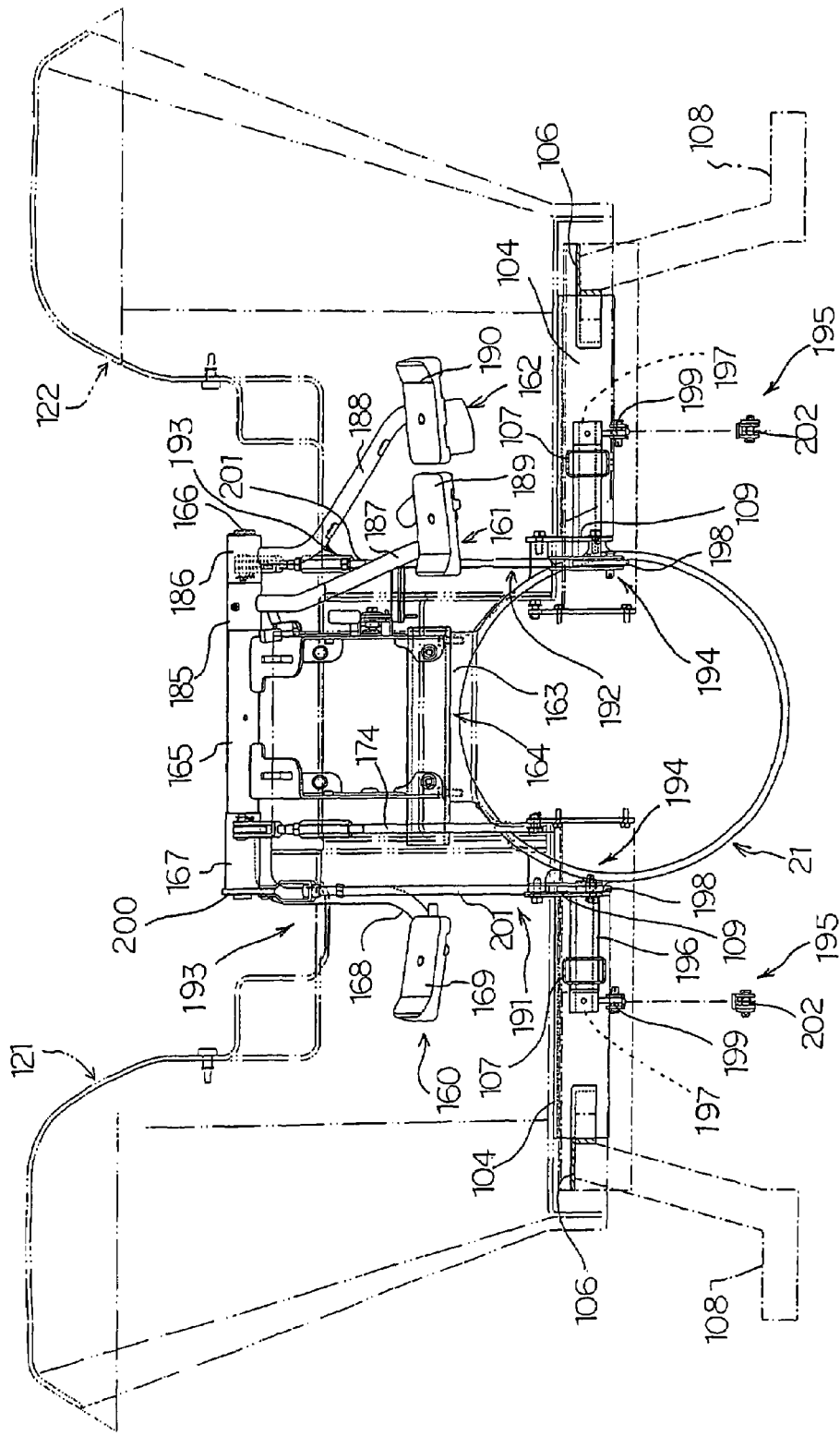
FIG. 14 is an explanatory back view of a clutch pedal and a brake pedal.

The left interlocking mechanism 191 is, as shown in FIG. 2, FIG. 10 and FIG. 14, constituted of a start-end-side link mechanism 193, a relay mechanism 194 and a terminal-end-side link mechanism 195.

Here, in the relay mechanism 194, a cylindrical relay mechanism support body 196 which extends in the lateral direction is mounted on a front portion of the intermediate support frame forming member 107 formed on the above-mentioned left-side front support frame body 101 thus allowing the relay mechanism support body 196 to support the relay mechanism 194.

Further, in the relay mechanism 194, a relay support shaft 197 which extends in the lateral direction is inserted in the inside of the cylindrical relay mechanism support body 196, and a proximal end portion of an inner relay arm 198 which constitutes one-side relay arm is mounted on an inner end portion of a relay support shaft 197. Further, a distal end portion of the inner relay arm 198 is extended frontwardly and a proximal end portion of an outer relay arm 199 which constitutes another-side relay arm is mounted on an outer end portion of the relay support shaft 197. Further, a distal end portion of the outer relay arm 199 is allowed to extend downwardly. Accordingly, both relay arms 198, 199 can be integrally rotatably operated by way of the relay support shaft 197.

In this manner, the relay mechanism support body 196 is mounted on the front support frame body 101 which constitutes the step portion support body for supporting the synthetic-resin-made step portion and the relay mechanism 194 is supported on the relay mechanism support body 196 and hence, it is possible to favorably ensure the supporting rigidity of the relay mechanism 194 thus realizing the smooth and reliable operation of the relay mechanism 194.

In the start-end-side link mechanism 193, a proximal end of a pedal interlocking arm 200 is mounted on a left end portion of the pedal support shaft 166 and, at the same time, a distal end portion of the pedal interlocking arm 200 is extended frontwardly. Further, between the distal end portion of the pedal interlocking arm 200 and a distal end portion of the inner relay arm 198 of the relay mechanism 194, a straight start-end-portion-side connecting rod 201 which extends vertically is interposed.

In the terminal-end-side link mechanism 195, between a distal end portion of the operating arm 62 mounted on the above-mentioned multi-disc brake device 50 and a distal end portion of the outer relay arm 199 of the relay mechanism 194, a linear terminal-end-portion-side connecting rod 202 which extends in the fore-and-aft direction is interposed.

In this manner, the linear start-end-portion-side connecting rod 201 which extends vertically is interposed between the pedal interlocking arm 200 which is interlockingly operated with the left brake pedal 161 and the inner relay arm 198 which is mounted in the relay mechanism 194, the pedal interlocking arm 200 and the inner relay arm 198 are smoothly and surely interlockingly operated with each other by way of the linear start-end-portion-side connecting rod 201. At the same time, between the outer relay arm 199 formed on the relay mechanism 194 and the operating arm 62 formed on the multi-disc brake device 50, the linear terminal-end-portion-side connecting rod 202 which extends in the fore-and-aft direction is interposed and hence, the outer relay arm 199 and the operating arm 62 are smoothly and surely interlockingly operated with each other by way of the linear terminal-end-side connecting rod 202 thus enhancing the brake manipulating property of the multi-disc brake device 50.

Figure 13:
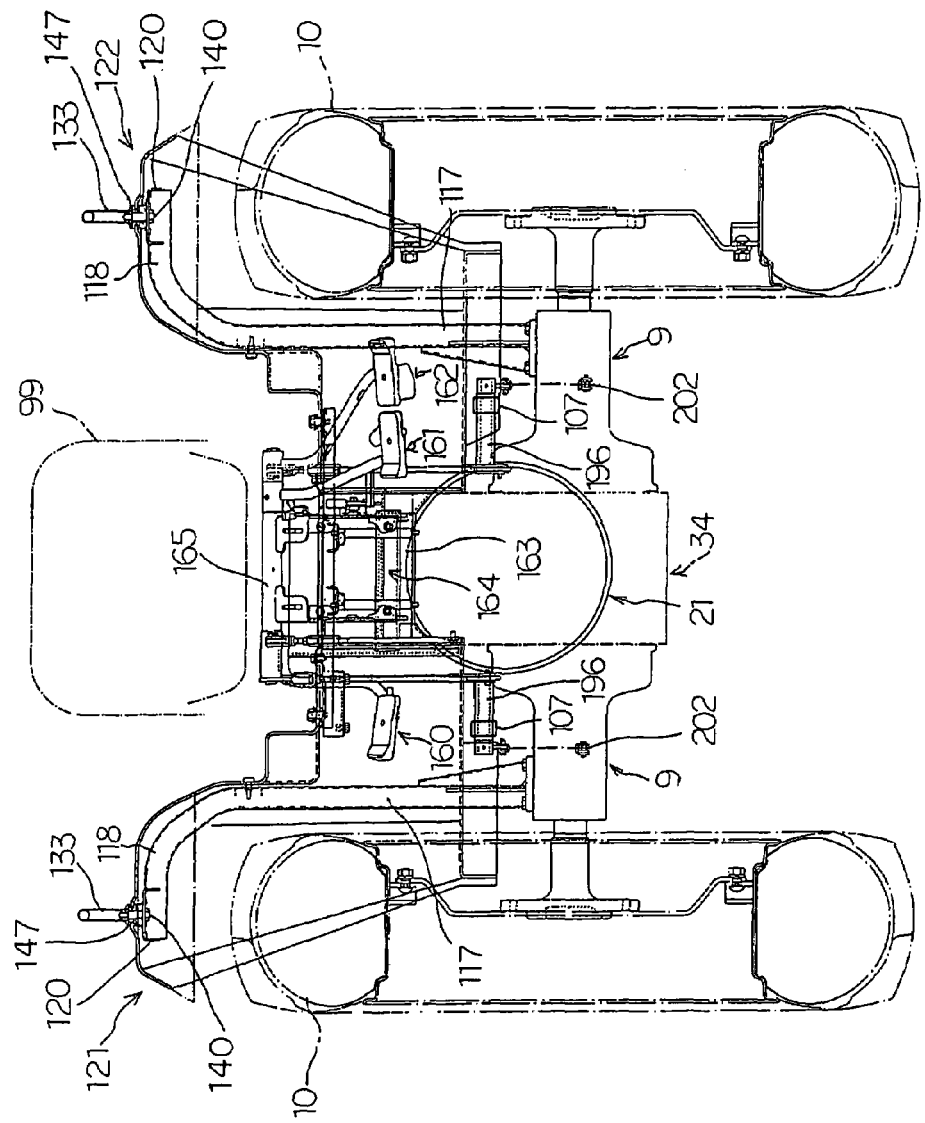
FIG. 13 is an explanatory back view of a driving portion.

Further, the right-side interlocking mechanism 192 has the substantially equal constitution as the above-mentioned left-side interlocking mechanism 191 and hence, in FIG. 10, FIG. 13 and FIG. 14, constitutional members which correspond to the constitutional members of the left-side interlocking mechanism 191 are indicated by same symbols.

Further, in the driving portion 6, on the left side and below the driver's seat 99, a PTO-use clutch lever 205 is arranged as a clutch manipulating member and, hereinafter, the constitution of the PTO-use clutch lever 205 is explained in conjunction with FIG. 2 and FIG. 3.

(Explanation of PTO-Use Clutch Lever 205)

That is, the PTO-use clutch lever 205 is, as shown in FIG. 2 and FIG. 3, interlockingly connected with the above-mentioned PTO-use clutch 26 by way of a PTO-use clutch connecting mechanism 206 and hence, the PTO-use clutch 26 can be manipulated by the PTO-use clutch lever 205.

Here, as shown in FIG. 2, in the inside of the clutch housing 21, on an outer peripheral surface of the above-mentioned traveling clutch operating body 170, a cylindrical PTO-use clutch operating body 207 is fitted on in a state that the PTO-use clutch operating body 207 is slidably movable in the fore-and-aft direction, a clutch operating member 208 is mounted on a front end peripheral portion of the PTO-use clutch operating body 207 and, at the same time, the clutch operating member 208 is arranged close to the power receiving arm 26a of the PTO-use clutch 26 in a state that the clutch operating member 208 faces the power receiving arm 26a of the PTO-use clutch 26 in an opposed manner.

Then, in the PTO-use clutch lever 205, as shown in FIG. 2 and FIG. 3, a lever guide body 211 is interposed between a mounting member 210 which is formed on a left-side portion of the front support frame forming member 113 of the above-mentioned rear-portion support frame body 102 and an upper portion of a left side wall of the differential case 34.

That is, the lever guide body 211 is constituted of a lever support member 212 which has side surfaces thereof directed in the lateral direction, and a lever guide member 213 which is formed by extending an upper end peripheral portion of the lever support member 212 in the leftward and outward direction and assumes an inclined posture to exhibit an inclined surface having a low front portion and high rear portion on a front surface thereof. In the lever guide member 213, a clutch engaging guide groove 214 which is formed to have a short width in the vertical direction and a clutch disengaging guide groove 215 which is formed to have a long width in the vertical direction are formed close to each other in the lateral direction and, at the same time, a communication groove 216 which communicably connects upper end portions of both guide grooves 214, 215 is formed.

Further, on a rear lower portion of a left surface of the lever support member 212, a lever support shaft 217 which has an axis thereof directed in the lateral direction is mounted. A proximal end portion of the PTO-use clutch lever 205 which is formed in an extended manner in the fore-and-aft direction is pivotally supported on the lever support shaft 217 thus allowing the PTO-use clutch lever 205 to be vertically rotatable. Further, the PTO-use clutch lever 205 is pushed to a left surface side of the lever support member 212 by a compression spring 218 which is wound around an outer peripheral surface of the lever support shaft 217. In such a pushed state, an intermediate portion of the PTO-use clutch lever 205 is inserted in either one of the grooves 214, 215, 216.

In this manner, by allowing the PTO-use clutch lever 205 to be vertically rotatable about lever support shaft 217 and to be inclined in the leftward direction against a resilient biasing force of the compression spring 218, the intermediate portion of the PTO-use clutch lever 205 is slidably manipulable between the clutch engaging guide groove 214, the communication groove 216 and the clutch disengaging guide groove 215 thus defining a clutch engaging manipulation position (a) in which the lower end portion of the clutch engaging guide groove 214 is arranged in the direction to allow the PTO-use clutch lever 205 to move against a dead weight of the PTO-use clutch lever 205 and a clutch disengaging manipulation position (b) in which the lower end portion of the clutch disengaging guide groove 215 is arranged in the direction (downward direction) to allow the PTO-use clutch lever 205 to move due to the dead weight of the PTO-use clutch lever 205.

In this manner, it is possible to move the PTO-use clutch lever 205 to the clutch disengaging manipulation position due to the dead weight thereof and hence, the number of parts can be reduced thus realizing the reduction of a manufacturing cost.

That is, it is unnecessary to provide a manipulation position restoring member such as a spring for restoring the PTO-use clutch lever 205 to the clutch disengaging manipulation position (b) and hence, it is possible to realize the reduction of number of parts and the reduction of manufacturing cost by an amount corresponding to the elimination of the manipulation position restoring member.

Further, a PTO-use clutch connecting mechanism 206 is interposed between an intermediate portion of the PTO-use clutch lever 205 and the rear end portion of the above-mentioned PTO-use clutch operating body 207.

That is, in the PTO-use clutch connecting mechanism 206, a relay lever body 220 is arranged in the vicinity of a rear portion of a left side wall of the main transmission case, a proximal portion of the relay lever body 220 is pivotally supported on a lever body support shaft 221 which has an axis thereof directed in the lateral direction so as to allow the relay lever body 220 to tilt in the fore-and-aft direction, and a linear first connecting rod 223 which extends in the vertical direction is interposed between a distal end portion of a rear lever member 222 which is formed on the relay lever body 220 and the intermediate portion of the PTO-use clutch lever 205.

Further, a linear second connecting rod 227 which extends in the fore-and-aft direction is interposed between a distal end portion of a front lever member 224 which is formed on the relay lever body 220 and a distal end portion of an outer interlocking arm 226 which is mounted on the left side wall of the clutch housing 21 by way of the arm support shaft 225.

Further, the arm support shaft 225 has an axis thereof directed in the lateral direction and is allowed to penetrate the left side wall of the clutch housing 21. A proximal end portion of the outer interlocking arm 226 is mounted on an outer end portion of the arm support shaft 225, while proximal end portion of an inner interlocking arm 228 is mounted on an inner end portion of the arm support shaft 225. A bifurcated engaging member 229 which is formed on a distal end portion of the inner interlocking arm 228 and constitutes an engaging body is engaged with an engaging pin 230 which is formed on a rear end portion of the PTO-use clutch operating body 207 in a projecting manner and constitutes a member to be engaged.

Here, the engaging pin 230 is allowed to project in the direction (leftward and outward direction in this embodiment) which is substantially orthogonal to the direction that the PTO-use clutch operating body 207 moves between an operable position and a non-operable position (the fore-and-aft direction in this embodiment) and the bifurcated engaging member 229 is engaged with the engaging pin 230. Further, the bifurcated engaging member 229 is engageable from both directions of the operable position side and the non-operable position side of the PTO-use clutch operating body 207 (the fore-and-aft direction in this embodiment) and is interlockingly connected with the PTO-use clutch lever 205.

In this manner, by grasping a distal end grasping portion 231 of the PTO-use clutch lever 205 and by arranging the PTO-use clutch lever 205 to the clutch engaging manipulation position (a) by way of the clutch disengaging guide groove 215 → the communication groove 216 → the clutch engaging guide groove 214 → clutch engaging manipulation position (a) against the dead weight of the PTO-use clutch lever 205, in FIG. 2, the first connecting rod 223 is slidably moved upwardly, the relay lever body 220 is rotated in the counterclockwise direction, the second connecting rod 227 is slidably moved rearwardly, the outer interlocking arm 226 and the inner interlocking arm 228 are integrally rotated in the counterclockwise direction about the arm support shaft 225, and the PTO-use clutch operating body 207 which is interlockingly connected with the inner interlocking arm 228 by way of the bifurcated engaging member 229 and the engaging pin 230 has a position thereof changed to an operable position to allow the PTO-use clutch 26 to assume the clutch engaging state.

Further, by grasping the distal end grasping portion 231 of the PTO-use clutch lever 205 and by arranging the PTO-use clutch lever 205 to the clutch disengaging manipulation position (b) by way of the clutch engaging guide groove 214 → the communication groove 216 → the clutch disengaging guide groove 215 formed in the direction that the PTO-use clutch lever 205 moves due to the dead weight thereof → the clutch disengaging manipulation position (b), in FIG. 2, the first connecting rod 223 is slidably moved downwardly, the relay lever body 220 is rotated in the clockwise direction, the second connecting rod 227 is slidably moved forwardly, the outer interlocking arm 226 and the inner interlocking arm 228 are integrally rotated in the clockwise direction about the arm support shaft 225, and the PTO-use clutch operating body 207 which is interlockingly connected with the inner interlocking arm 228 by way of the bifurcated engaging member 229 and the engaging pin 230 has a position thereof changed to a non-operable position to allow the PTO-use clutch 26 to assume the clutch disengaging state.

Here, the bifurcated engaging member 229 which is interlockingly connected with the PTO-use clutch lever 205 is formed on the upper end portion of the inner interlocking arm 228 which is arranged in a substantially vertically erected manner by the arm support shaft 225, the bifurcated engaging member 229 is engaged with the engaging pin 230 from the fore-and-aft direction. Accordingly, with the use of the bifurcated engaging member 229, it is possible to surely change the position of the PTO-use clutch operating body 207 to either one of the operable position and the non-operable position by the bifurcated engaging member 229 by way of the engaging pin 230 and hence, the number of part can be reduced and the manufacturing cost can be also reduced.

That is, since the PTO-use clutch operating body 207 can be restored in the non-operable position, it is no more necessary to additionally provide an operating position restoring member such as spring whereby the reduction of the number of parts and the reduction of the manufacturing cost can be realized by an amount corresponding to the non-use of the operating position restoring member.

Further, in this embodiment, the traveling clutch 25 can be manipulated using the clutch pedal 160, while another PTO-use clutch lever 205 different from the clutch pedal 160 is interlockingly connected with the PTO-use clutch 26 thus allowing the PTO-use clutch lever 205 to manipulate the PTO-use clutch 26. Accordingly, it is possible to simplify the structure and, at the same time, a step-in stroke and a step-in manipulating force can be reduced and hence, a burden which an operator bears can be reduced.

Further, it is possible to overcome drawbacks that the power is suddenly transmitted to the PTO-use power system so that a large impact is generated or gears are broken.

Figure 15:
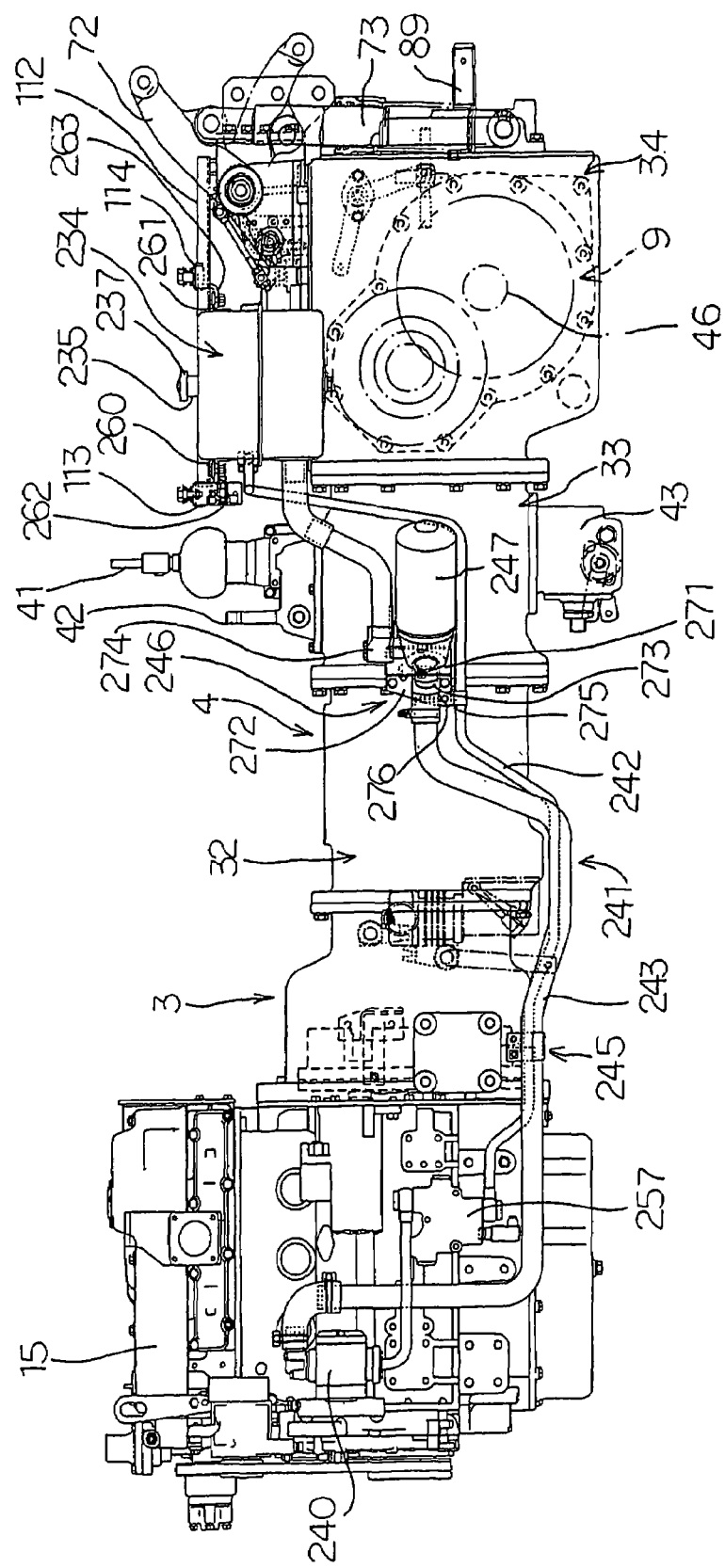
FIG. 15 is an explanatory side view of hydraulic piping.
Figure 16:
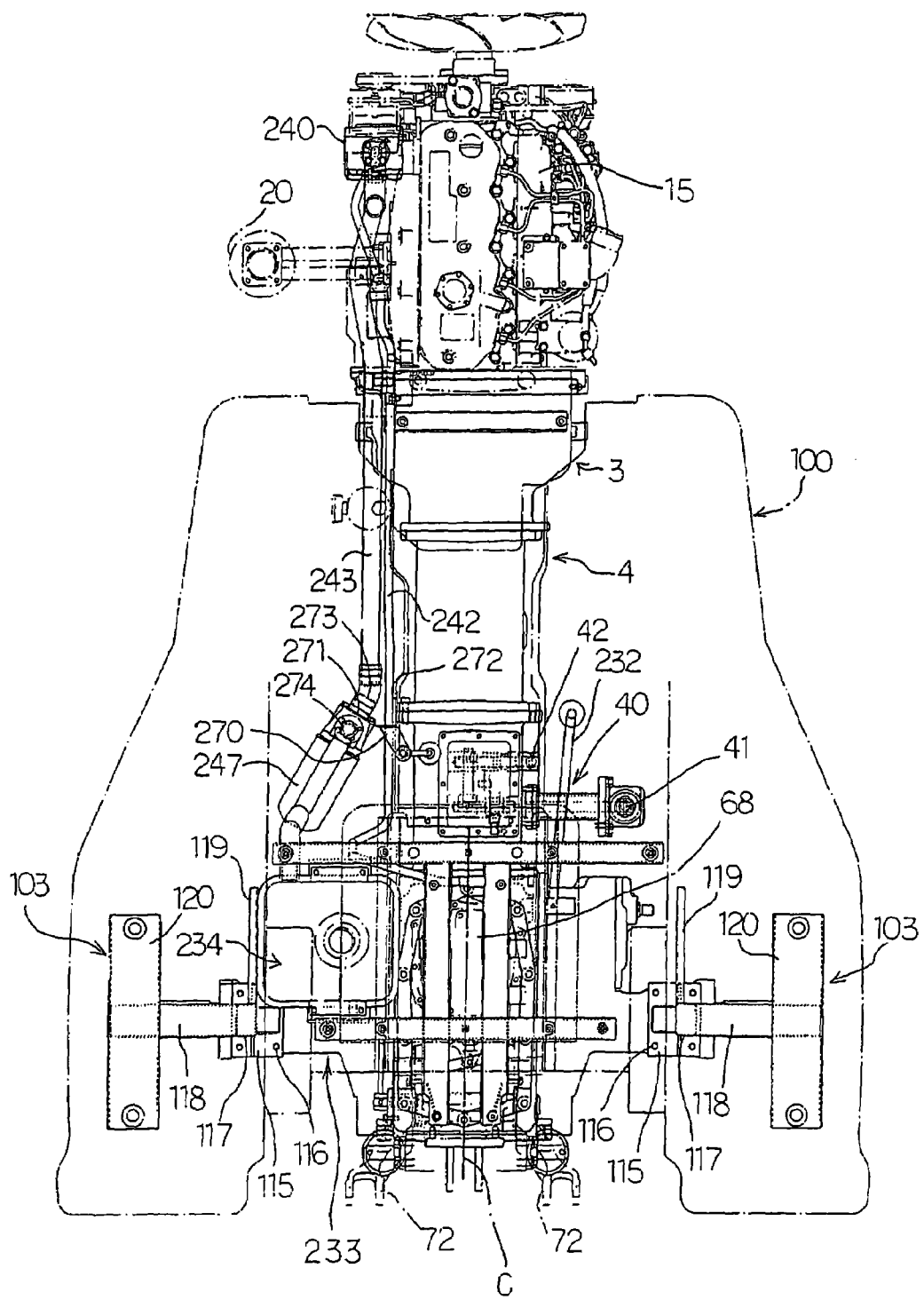
FIG. 16 is an explanatory plan view of the hydraulic piping.

Further, in this embodiment, in a space 233 defined between the hydraulic equipment for elevation and lowering such as the hydraulic circuit body 68, the hydraulic control valves 69 and the like which are arranged on an upper portion of the differential case 34 as shown in FIG. 15 and FIG. 16 and the rear wheel 10 which is interlockingly connected to the left-side portion of the differential case 34, a working oil tank 234 which stores a working oil for operating hydraulic devices such as the lift cylinder 73 and the like is arranged. Hereinafter, the constitution of the working oil tank 234 is explained in conjunction with FIG. 4, FIG. 10, FIG. 15 and FIG. 16.

(Explanation of Working Oil Tank 234)

That is, the working oil tank 234 is arranged in a rectangular box shape and mounted above the rear axle 46 on the left side thereof. Further, with respect to an imaginary center line C in the lateral width direction of the machine body, on one side (a right side in this embodiment), a plurality of main and sub transmission levers 41, 42 which constitute various manipulation levers is arranged while on another side (a left side in this embodiment) which is opposite to one side, the working oil tank 234 is arranged.

Here, in a ceiling portion of the working oil tank 234, an oil filling port 235 is formed. The oil filling port 235 is arranged to project upwardly through an oil filling port insertion hole 134 formed in a proximal portion 236 of the left-side fender forming member 125 which extends inwardly from a position above the rear wheel 10 and covers the rear axle 46 from above. Numeral 237 indicates an oil filling port rid.

Here, the mounting structure of the working oil tank 234 is explained. As shown in FIG. 4, FIG. 15 and FIG. 16, a front connecting bracket 260 is mounted on an upper portion of the front wall of the working oil tank 234 in a state that the front connecting bracket 260 projects frontwardly and, a rear connecting bracket 261 is mounted on an upper portion of the rear wall of the working oil tank 234 in a state that the rear connecting bracket 261 projects rearwardly and, a front connecting receiving member 262 is mounted in a state that the front connecting receiving member 262 projects rearwardly from the left side portion of the above-mentioned front support frame forming member 113 and a rear connecting receiving member 263 is mounted in a state that the rear connecting receiving member 263 projects frontwardly from the left side portion of the rear support frame forming member 114.

In such a condition, the front and rear connecting brackets 260, 261 are respectively overlapped to the front and rear connecting receiving members 262, 263 from above and detachably connected using connecting bolts 264, 265 and hence, the working oil tank 234 can be mounted in an extended manner.

Further, the working oil tank 234 is arranged in the inside of a space 233 which is defined between the hydraulic equipment for elevation and lowering which is mounted on the upper portion of the differential case 34 and the rear wheel 10 which is interlockingly connected with the left side of the differential case 34. Accordingly, the space 233 can be efficiently utilized thus ensuring the favorable assembling property and the maintenance property of the machine body.

In this case, since the working oil tank 234 is arranged above the rear axle 46, the assembling property and the maintenance property of the machine body can be further favorably ensured.

Here, since the working oil tank 234 is mounted on the left side which is opposite to the right side on which the main and sub transmission levers 41, 42 are mounted with respect to the imaginary center line C in the lateral width direction of the machine body, the space 233 can be efficiently utilized and the assembling property and the maintenance property of the machine body can be favorably ensured.

Further, since the oil filling port 235 of the working oil tank 234 is arranged to project inwardly from above the rear wheel 10 and further, the oil filling port 235 is arranged to project upwardly from a proximal portion 236 of the left-side fender forming member 125 which covers the rear axle from above and hence, it is possible to easily realize the oil filling operation through the oil filling port 235.

Further, in this embodiment, as shown in FIG. 1, while a hydraulic pump 240 is interlockingly connected to the left-side front portion of the engine 15 mounted on the engine prime mover portion 2, the hydraulic devices for elevation and lowering such as the hydraulic circuit body 68 and the hydraulic control valve 69 are mounted on the upper portion of the differential case 34 and a hydraulic piping 241 is arranged between the hydraulic devices for elevation and lowering and the above-mentioned hydraulic pump 240. Hereinafter, the constitution of the hydraulic piping 241 is explained in conjunction with FIG. 15 and FIG. 16.

(Explanation of Hydraulic Piping 241)

That is, the hydraulic piping 241 is, also as shown in FIG. 15 and FIG. 16, formed of a high-pressure feed pipe 242 which transmits the working oil from the hydraulic pump 240 to the hydraulic circuit body 68 under high pressure and a low-pressure return pipe 243 which returns the working oil from the hydraulic circuit body 68 to the hydraulic pump 240 under low pressure. The high-pressure feed pipe 242 uses a metal-made pipe having a small diameter, while the low-pressure return pipe 243 uses a rubber-made pipe having a large diameter.

Here, while a flow divider 257 is arranged on an intermediate portion of the high-pressure feed pump 242, the working oil tank 234 is mounted on the upstream side portion of the low-pressure return pipe 243, and a filter 247 is mounted on the downstream side portion of the working oil tank 234 and the working oil is circulated through the filter 247.

Further, the high-pressure feed pipe 242 and the low-pressure return pipe 243 are arranged close to each other on one side of the machine body (left side in this embodiment). The front intermediate portion is, as shown in FIG. 17 to FIG. 19, integrally mounted on a mounting seat 244 formed on the lower portion of the left side wall of the clutch housing 21 using a front portion support member 245, and the rear intermediate portion is integrally mounted on the connection portion between the main transmission case 32 and the sub transmission case 33 using a rear portion support member 246.

Still further, the front portion support member 245 is configured to be detachable from the mounting seat 244 and the rear portion support member 246 is configured to be detachable from the main and sub transmission cases 32, 33.

Figure 17:
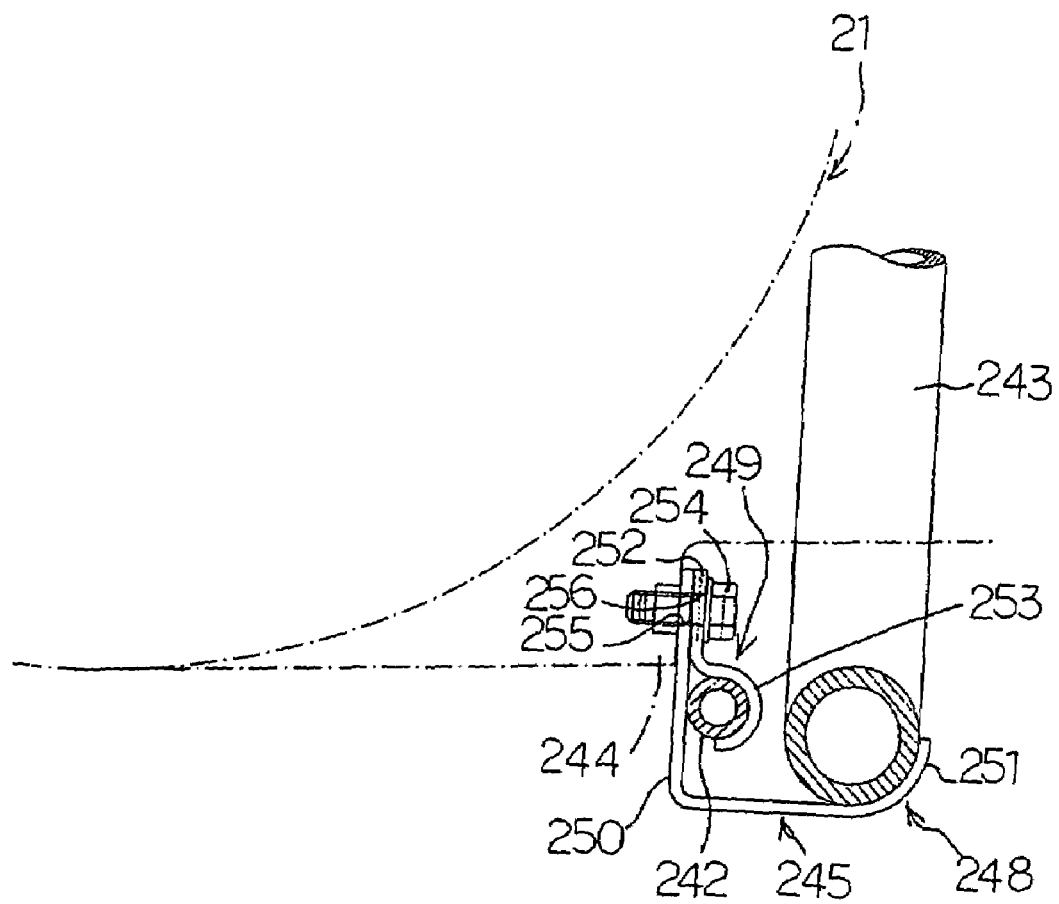
FIG. 17 is an explanatory cross-sectional front view showing the mounting structure of the hydraulic piping.
Figure 18:
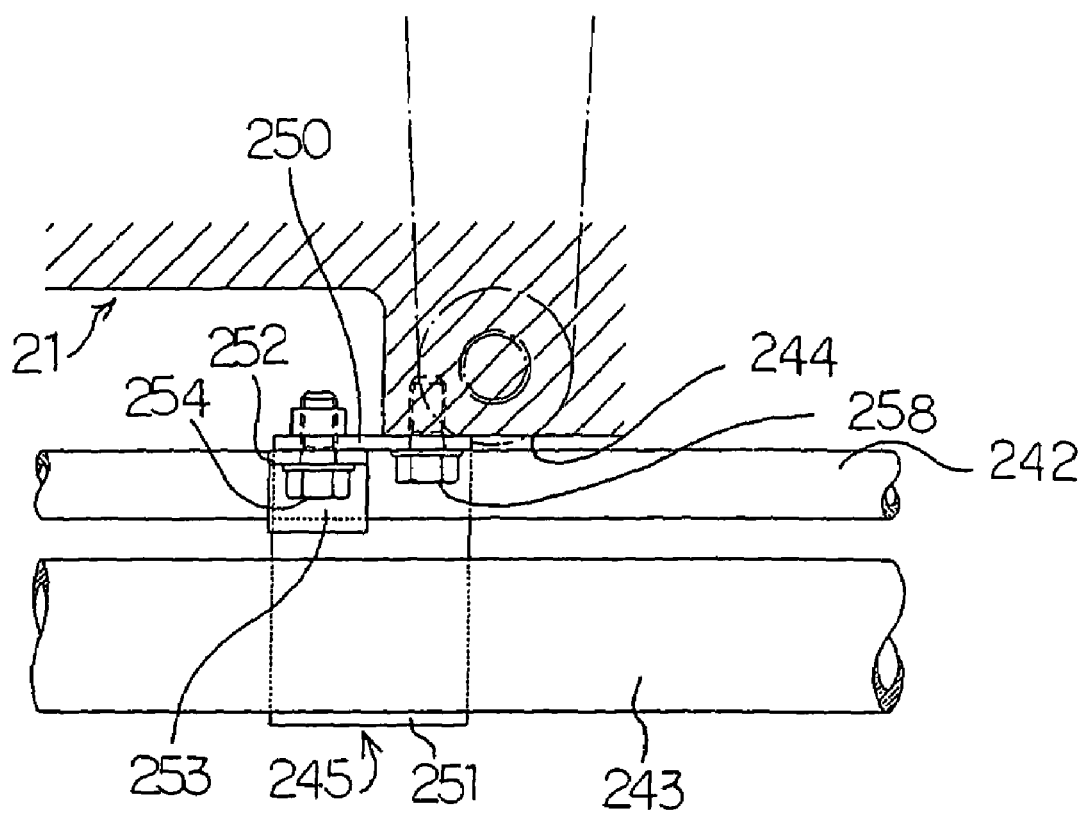
FIG. 18 is an explanatory plan view showing the mounting structure of the hydraulic piping.
Figure 19:
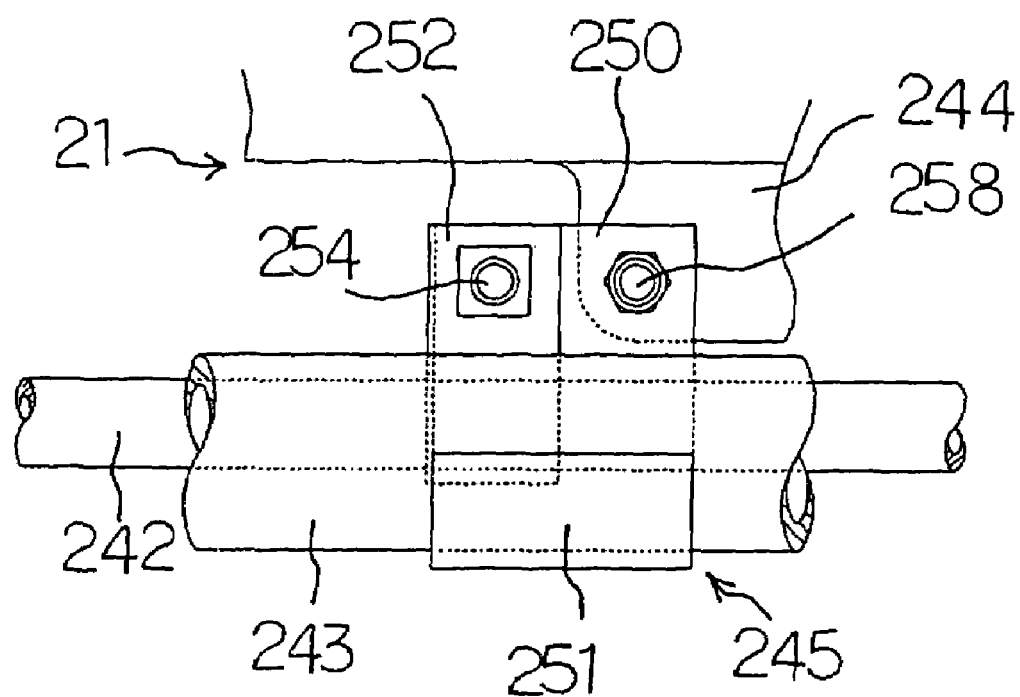
FIG. 19 is an explanatory side view showing the mounting structure of the hydraulic piping.

Here, the constitution of the front portion support member 245 is specifically explained in conjunction with FIG. 17 to FIG. 19. The front portion support member 245 includes a return pipe support body 248 and a feed pipe support body 249.

Here, the return pipe support body 248 is formed of a return pipe mounting member 250 which extends in the vertical direction and a return pipe support member 251 which is substantially horizontally extended outwardly from a lower end peripheral portion of the return pipe mounting member 250 and has a distal end peripheral portion thereof bent along a quarter circular arcuate surface formed on the lower outer side of the low-pressure return pipe 243 and supports the low-pressure return pipe 243 in a state that the extended and bent portion holds the low-pressure return pipe 243 from below. The rear-side upper portion of the return pipe mounting member 250 is detachably mounted on the mounting seat 244 which is formed on a lower portion of a left side wall of the clutch housing 21 using mounting bolts 248.

Further, the feed pipe support body 249 is formed of a feed pipe mounting member 252 which extends in the vertical direction and a feed pipe support member 253 which has a lower end peripheral portion of the feed pipe mounting member 252 bent and thereafter, extended along the outer peripheral surface of the high-pressure feed pipe 242 in a semi circular shape and supports the high-pressure feed pipe 242 in a state that the extended and bent portion holds the high-pressure feed pipe 242 from outside. The feed pipe mounting member 252 is overlapped to a front upper portion of the above-mentioned return pipe mounting member 250 from the outside and, at the same time, is detachably mounted on the return pipe mounting member 250 using a connecting bolt 254. Numerals 255, 256 indicate bolt holes.

Still further, by forming the feed pipe support body 249 in a state that the feed pipe support body 249 is allocated within the substantially front and back width and within the vertical width of the return pipe support body 248, the high-pressure feed pipe 242 and the low-pressure return pipe 243 can be arranged close to each other within the left and right width of the return pipe support member 251.

In such a constitution, the high-pressure feed pipe 242 and the low-pressure return pipe 243 are arranged close to each other on the left side of the machine body and hence, the assembling operations of these pipes can be simultaneously performed on the left side of machine body thus enhancing the efficiency of the assembling operation.

Here, since the high-pressure feed pipe 242 and the low-pressure return pipe 243 are integrally mounted using the front portion support member 245 and the rear portion support member 246 which are detachable from the machine body, these pipes can be formed into a unit and can be detachably mounted on the machine body thus enhancing the assembling property and the maintenance property.

Further, in the feed pipe support body 249 of the front portion support member 245, by connecting the feed pipe mounting member 252 to the return pipe mounting member 250 using a bolt 254, the high-pressure feed pipe 242 can be held in a state that the high-pressure feed pipe 242 is sandwiched from the left side and right side between the feed pipe support member 253 and the return pipe mounting member 250 and hence, in the state, it is sufficient to only mount or dismount the return pipe mounting member 250 on or from the mounting seat 244 thus enhancing the assembling property and the maintenance property also from this point.

Further, the rear portion support member 246 includes, as shown in FIG. 15 and FIG. 16, a mounting body 270 which is detachably mounted on the left side wall of the sub transmission case 33, the plate-like filter mounting body 271 which is formed by extending frontwardly and outwardly from the mounting body 270, and the plate-like feed pipe mounting body 272 which is formed by extending frontwardly from the mounting body 270.

Here, the front end portion of the filter 247 is mounted on the filter mounting body 271, and the rear end portion 273 formed on the intermediate portion of the low-pressure return pipe 243 is communicably connected with the front end portion of the filter 247 and the front end portion 274 formed on the intermediate portion of the low-pressure return pipe 243 is communicably connected with the front upper portion of the filter 247.

The return pipe mounting member 275 is detachably mounted on the front lower portion of the feed pipe mounting body 272 using mounting bolts 276 and hence, the intermediate portion of the high-pressure feed pipe 242 can be held by the lower portion of the feed pipe mounting member 275.

Tractor as Second Embodiment

Figure 21:
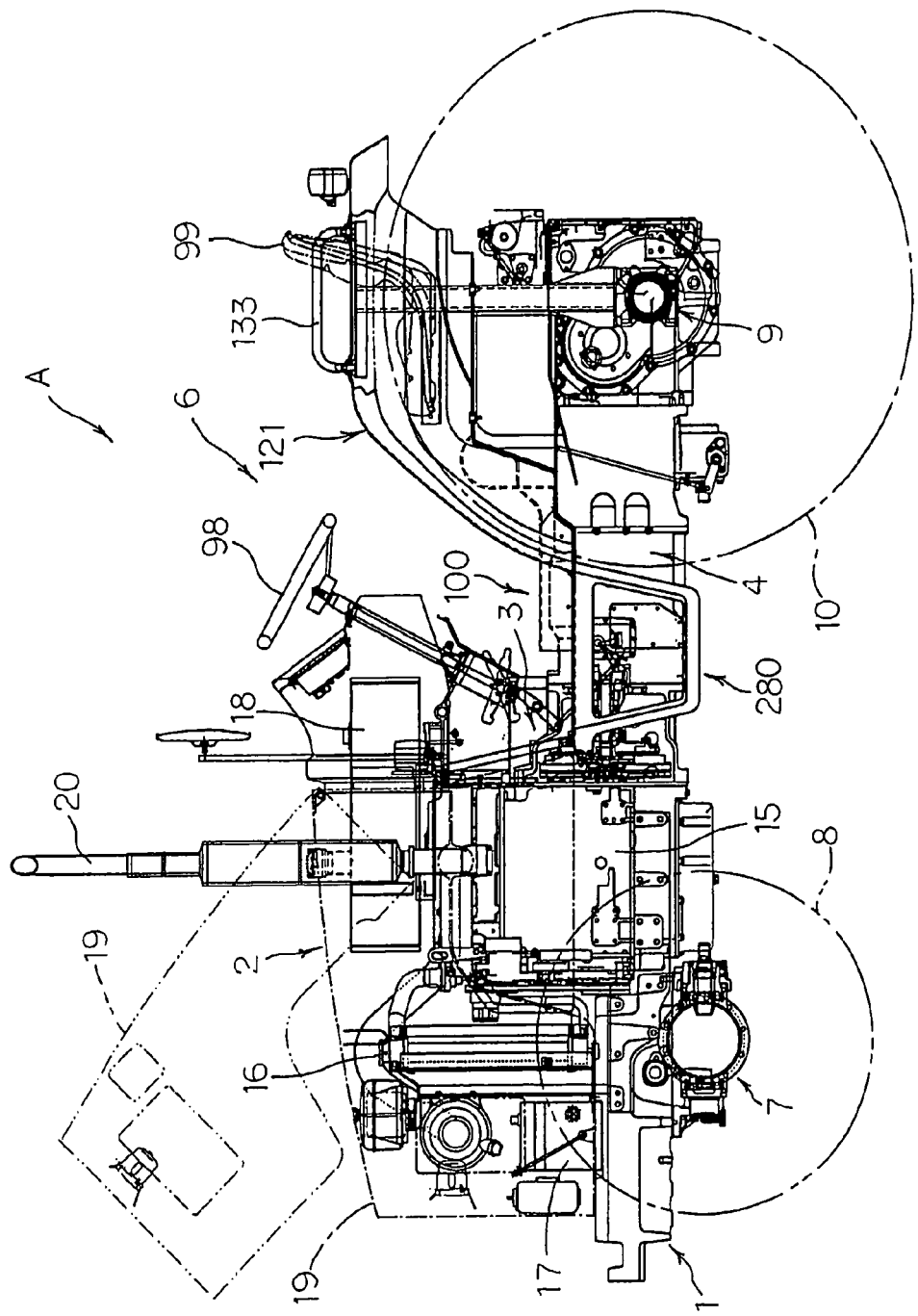
FIG. 21 is an explanatory side view of a tractor of a second embodiment.
Figure 22:
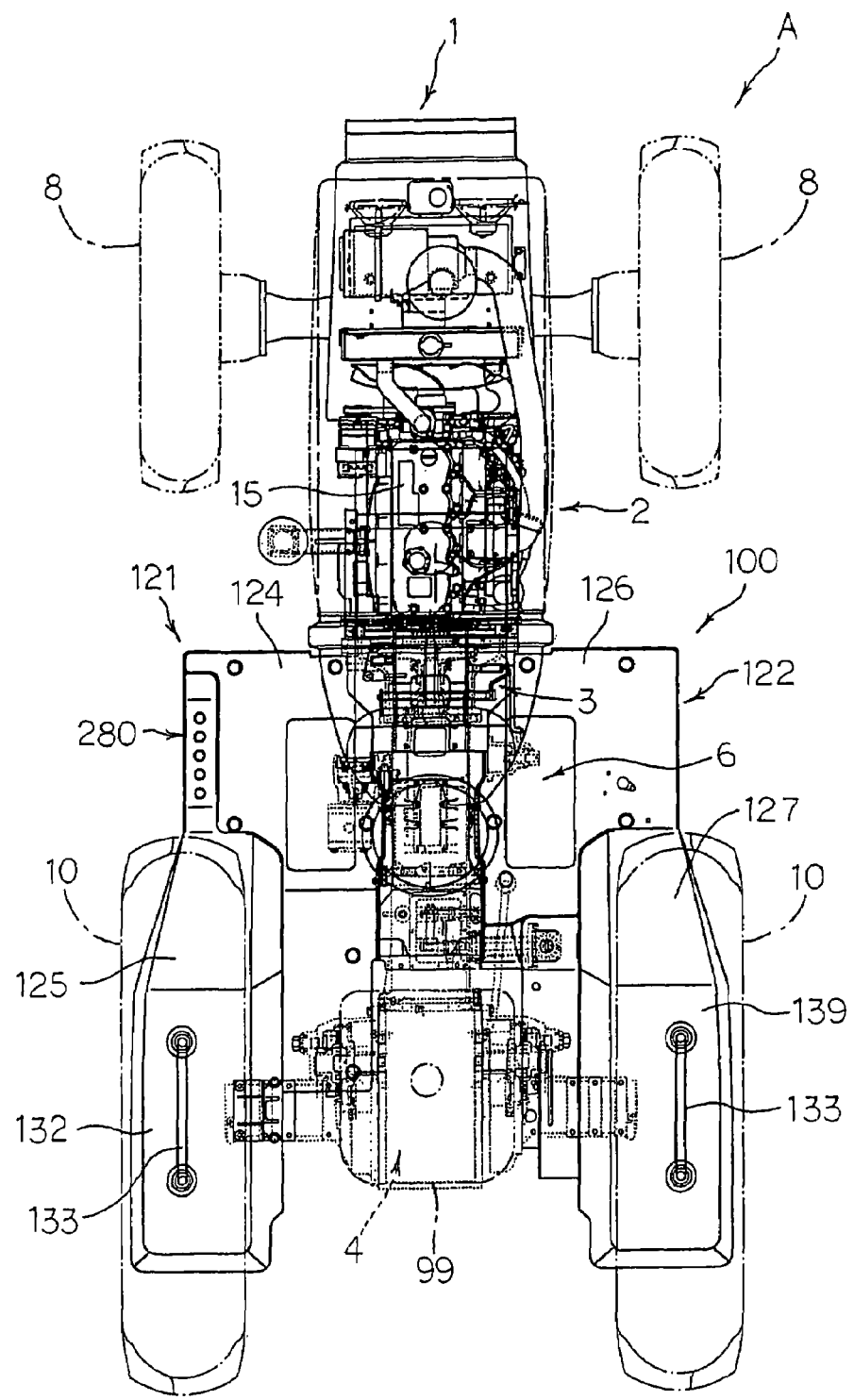
FIG. 22 is a plan view of the tractor.

Symbol A in FIG. 21 and FIG. 22 indicates a tractor of the second embodiment according to the present invention. Although the tractor A has the same basic structure as the tractor A of the above-mentioned first embodiment, this embodiment differs from the first embodiment with respect to a shape of the left cover forming body 121 out of left and right cover forming bodies 121, 122.

Figure 23:
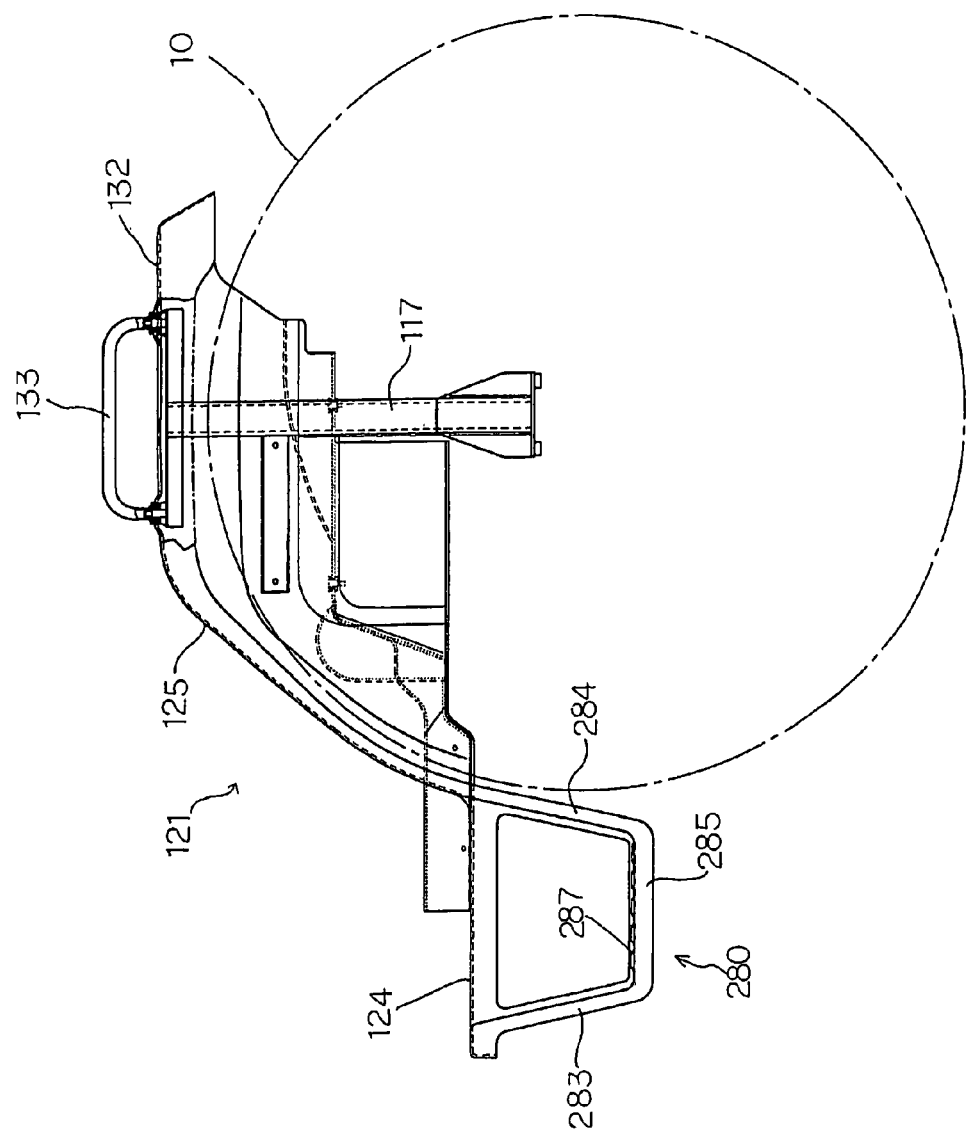
FIG. 23 is a left side view of the cover body.
Figure 24:
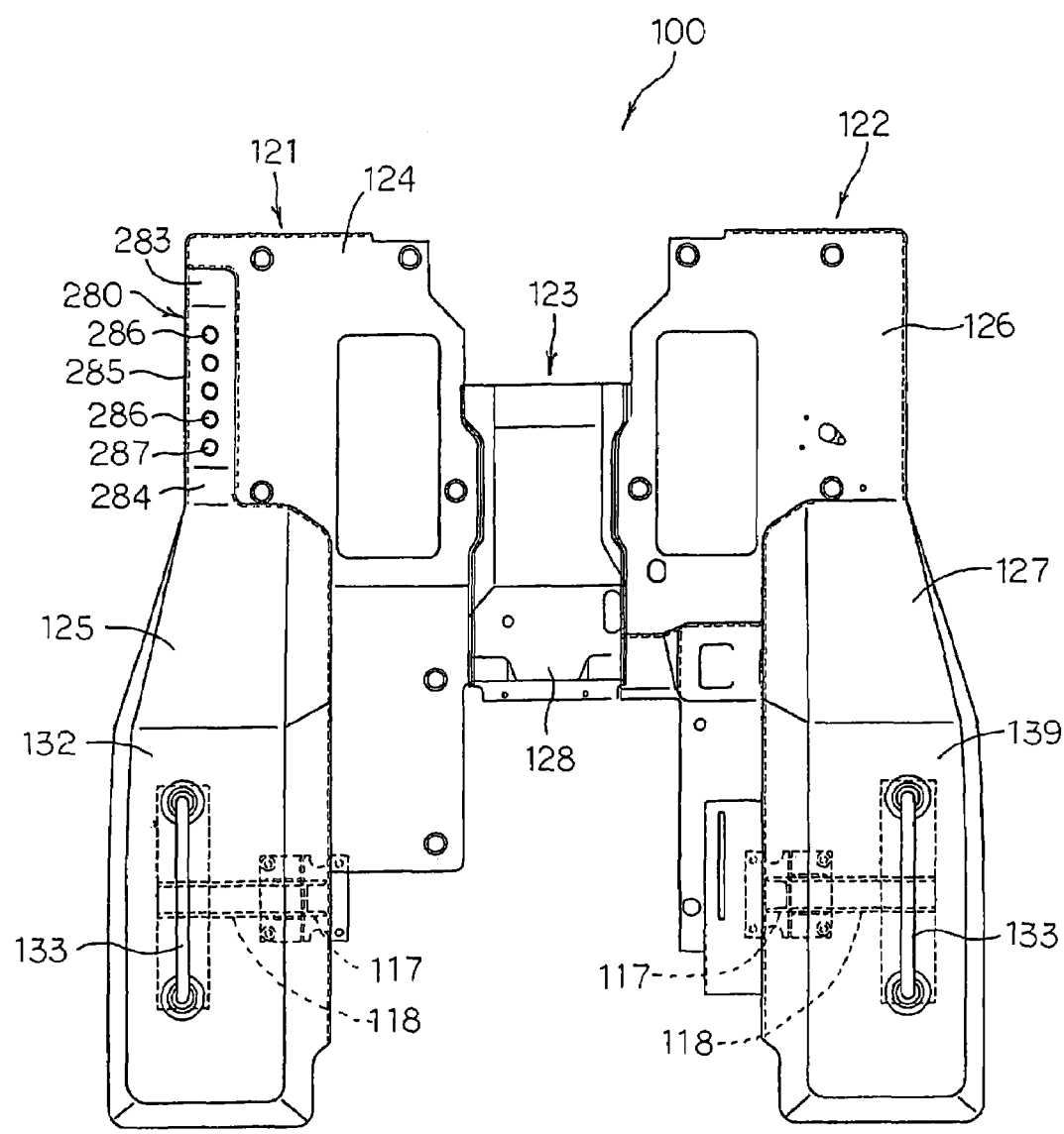
FIG. 24 is a plan view of the cover body.

That is, the left cover forming body 121 integrally forms, as shown in also FIG. 23 and FIG. 24, a left auxiliary step member 280 on an outer peripheral portion of the left step forming member 124 in a vertically downwardly extending manner.

Further, the left auxiliary step member 280 forms a pair of front and rear left vertically extending members 283, 284 in a downwardly extending manner from a front portion and a rear portion of an outer peripheral portion of the left step forming member 124, while a plate-shaped left auxiliary step main member 285 which extends in the fore-and-aft direction is extended between and is integrally formed with lower end portions of both left vertically extending members 283, 284.

Further, a large number of left mud scraping holes 286 is formed in the left auxiliary step main member 285 in a state that the left mud scraping holes penetrate the left auxiliary step member 280 in the vertical direction and, at the same time, peripheral portions of the left mud scraping holes 286 are extended upwardly thus integrally forming left slippage preventing members 287 in a projecting manner.

In this manner, when an operator gets on and off the driving portion 6, by stepping on the left auxiliary step main member 285, the operator can easily get on and off the driving portion 6.

Here, since the left slippage preventing members 287 is formed on the left auxiliary step main member 285, even when mud or the like adheres to bottom of shoes of the operator, the operator can easily get on and off the driving portion 6 without slipping his or her stepped-on leg.

Then, it is possible to surely scrape off the mud on a ground through the left mud scraping holes 286 and hence, it is possible to prevent the generation of a drawback that the mud or the like is piled up on the left auxiliary step main member 285 and the left slippage preventing members 287 no more functions.

Further, the left auxiliary step member 280 is integrally formed on the outer peripheral portion of the left step forming member 124 and hence, compared to the left and right auxiliary step members 280, 281 of the first embodiment in which the auxiliary step bodies 108, 108 are separately formed, the number of parts and man-hours can be reduced.

Figure 25:
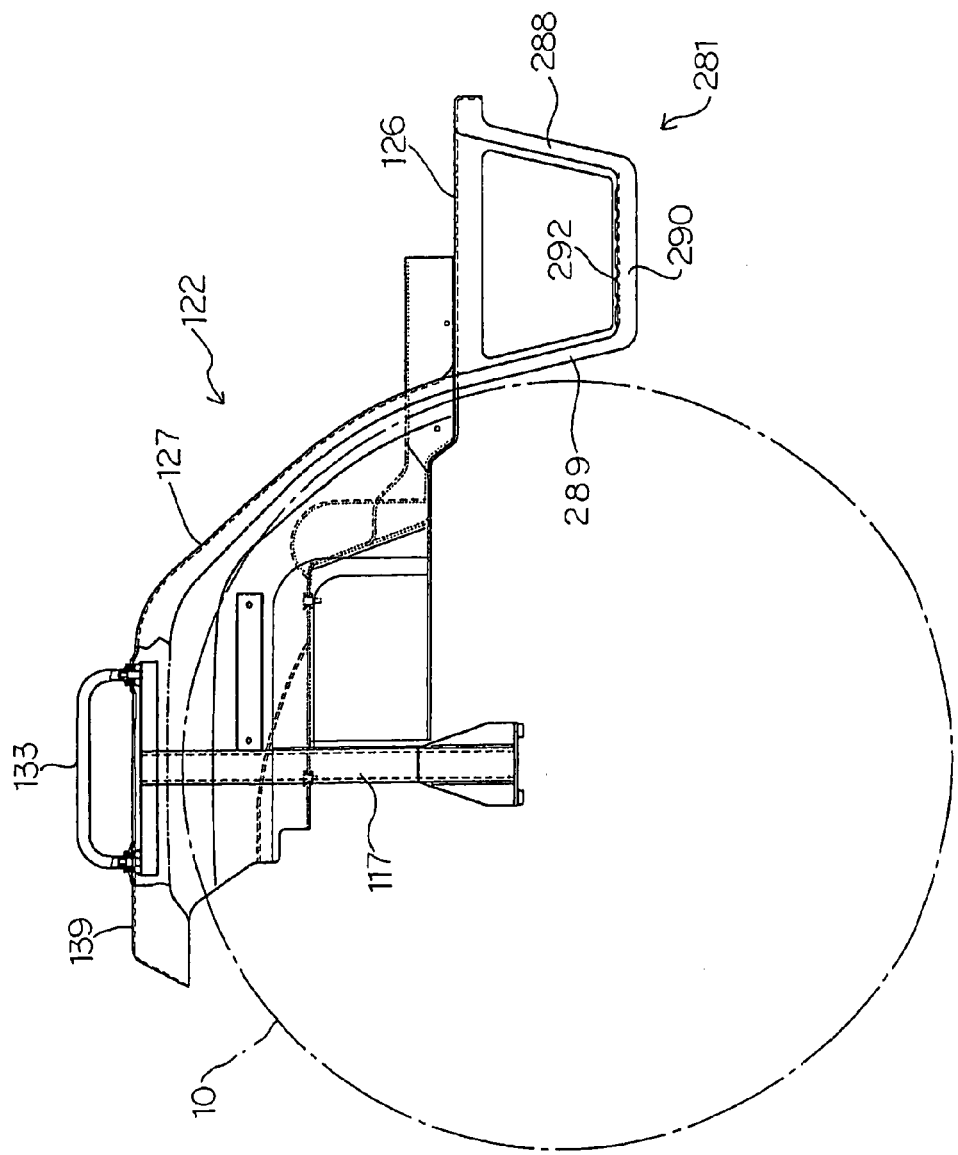
FIG. 25 is a right side view of the cover body which constitutes a modification.
Figure 26:
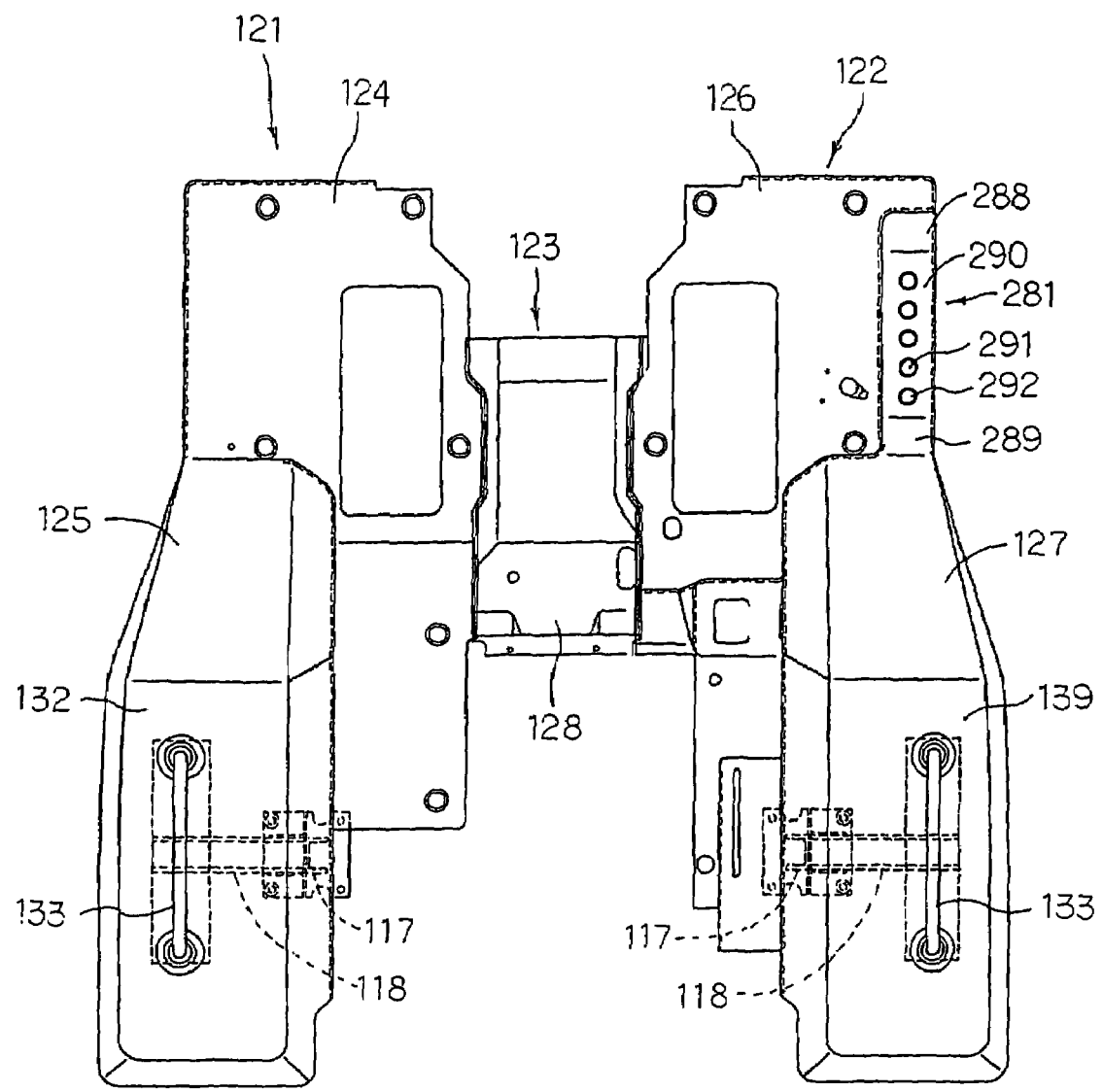
FIG. 26 is a plan view of the cover body.

In the above-mentioned embodiment, although the left auxiliary step member 280 is integrally formed only on the left cover forming body 121 which constitutes a side where the operator frequently gets on and off the driving portion 6, as shown in FIG. 25 and FIG. 26, it is possible to integrally form a right auxiliary step forming member only on the right cover forming body 122 thus reducing the manufacturing cost.

That is, the right cover forming body 122 integrally forms, as shown in also FIG. 25 and FIG. 26, a right auxiliary step member 281 on an outer peripheral portion of the right step forming member 126 in a vertically downwardly extending manner.

Further, the right auxiliary step member 281 forms a pair of front and rear left vertically extending members 288, 289 in a downwardly extending manner from a front portion and a rear portion of an outer peripheral portion of the right step forming member 126, while a plate-shaped right auxiliary step main member 290 which extends in the fore-and-aft direction is extended between and is integrally formed with lower end portions of both right vertically extending members 288, 289.

Further, a large number of right mud scraping holes 291 is formed in the right auxiliary step main member 290 in a state that the right mud scraping holes 291 penetrate the right auxiliary step main member 290 in the vertical direction and, at the same time, peripheral portions of the right mud scraping holes 291 are extended upwardly thus integrally forming right slippage preventing members 292 in a projecting manner.

In this manner, when an operator gets on and off the driving portion 6, by stepping on the right auxiliary step main member 290, the operator can easily get on and off the driving portion 6.

Here, since the right slippage preventing members 292 are formed on the right auxiliary step main member 290, even when mud or the like adheres to bottom of shoes of the operator, the operator can easily get on and off the driving portion 6 without slipping his or her stepped-on leg.

Then, it is possible to surely scrape off the mud on a ground through the right mud scraping holes 291 and hence, it is possible to prevent the generation of a drawback that the mud or the like is piled up on the right auxiliary step main member 290 and the right slippage preventing members 292 no more function.

Figure 27:
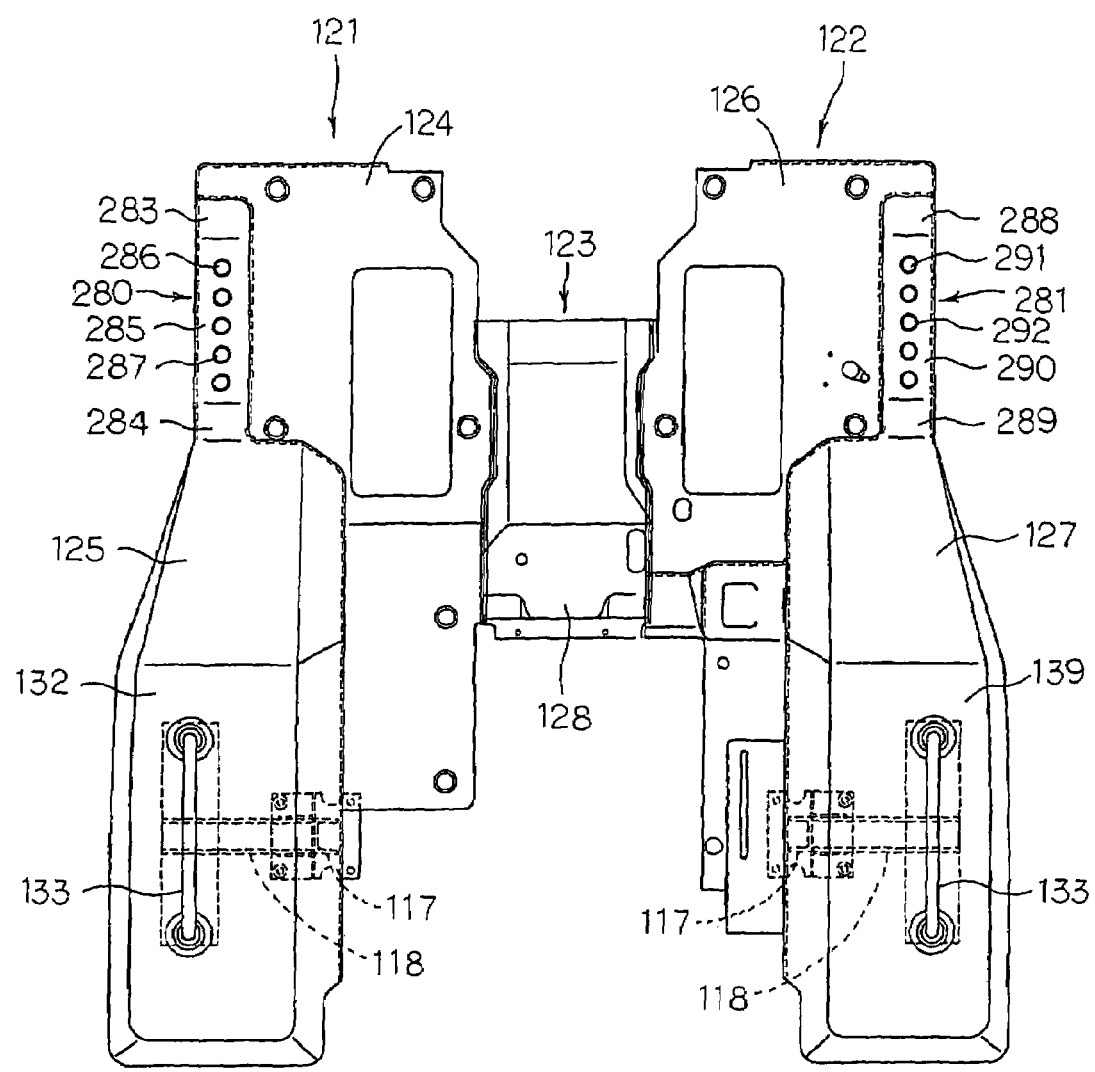
FIG. 27 is a plan view of the cover body which constitutes another modification.

Further, as shown in FIG. 27, it is also possible to integrally form left and right auxiliary step members 280, 281 on outer peripheral portions of the respective left and right step forming members 124, 125 of the left and right cover forming bodies 121, 122 in a state that the left and right auxiliary step members 280, 281 extend downwardly.

In this manner, since the operator can easily get on and off by making use of either one of the left and right auxiliary step members 280, 281 from either one of left and right sides of the driving portion 6 and hence, the operator can speedily and properly gets on and off the driving portion 6 from either one of left and right directions depending on an operation site.

The tractor structure according to the present invention is applicable to the structure in which a prime mover portion is arranged on a front portion of a body, a driving portion is arranged behind the prime mover portion, a transmission portion is arranged below a driver's seat which is formed in the driving portion, left-side and right-side rear wheels are mounted on the transmission portion by way of a rear axle case, and a cover body is extended over the driving portion, the transmission portion and the left-side and right-side rear wheels, the cover body constitutes a step portion of the driving portion and the cover body covers the transmission portion from above and covers the left-side and right-side rear wheels from the front side and above.

The invention claimed is:

1. A tractor in which a prime mover portion is arranged on a front portion of a machine body, a driving portion is arranged behind the prime mover portion, a transmission portion is arranged below a driver's seat which is formed in the driving portion, left-side and right-side rear wheels are mounted on the transmission portion by way of a rear axle case, and a cover body is extended over the driving portion, the transmission portion and the left-side and right-side rear wheels, the cover body constitutes a step portion of the driving portion and, the cover body covers the transmission portion from above and covers the left-side and right-side rear wheels from the front side and above, wherein the cover body is formed of a plurality of split-portions, and at least the split-portion which covers the transmission portion from above is detachably formed.

2. A tractor according to claim 1, wherein the cover body is divided and formed of left-side and right-side cover forming bodies and an intermediate cover forming body which is arranged between the left-side and right-side cover forming bodies and, at the same time, the respective forming bodies are detachably mounted on a machine body respectively, the left-side cover forming body integrally forms a left-side step forming member which forms a left-side portion of the step portion and a left-side fender forming member which covers the left-side rear wheel from the front side and from above, the right-side cover forming body integrally forms a right-side step forming member which forms a right side portion of the step portion and a right-side fender forming member which covers the right-side rear wheel from the front side and from above, the intermediate cover forming body is formed of a center step forming member which forms a center portion of the step portion and a transmission portion covering member which covers the transmission portion from above.

3. A tractor according to claim 1 or 2, wherein in the cover body, a transmission portion covering member is formed of a rigid member and portions of the cover body except for the transmission portion covering member are formed of synthetic resin, and the driver's seat is supported on the transmission portion covering member.

4. A tractor according to claim 2, wherein a pair of left and right fender-portion support bodies is mounted in an upwardly erected manner on the left-side and right-side rear axle cases which are respectively communicably connected to left-side and right-side walls of the transmission portion, and the left-side and right-side fender forming members are supported on upper end portions of the respective fender portion support bodies.

5. A tractor according to claim 4, wherein the fender forming members are formed on upper end portions of the fender portion support bodies and, at the same time, auxiliary handrail portions are mounted on the fender forming members.

6. A tractor according to claim 1, wherein the cover body is divided and formed of left-side and right-side cover forming bodies and an intermediate cover forming body which is arranged between the left-side and right-side cover forming bodies and, at the same time, the respective forming bodies are detachably mounted on a machine body respectively, and an auxiliary step member which an operator uses in getting on and off the tractor is integrally formed on at least one of the left-side and right-side cover forming bodies.

7. A tractor according to claim 1, wherein the cover body is divided and formed of left-side and right-side cover forming bodies and an intermediate cover forming body which is arranged between the left-side and right-side cover forming bodies and, at the same time, the respective forming bodies are detachably mounted on a machine body respectively, and an auxiliary step member which an operator uses in getting on and off the tractor is respectively integrally formed on both of the left-side and right-side cover forming bodies.

* * * * *